US007146458B2

(12) United States Patent
Smirnov et al.

(10) Patent No.: US 7,146,458 B2
(45) Date of Patent: Dec. 5, 2006

(54) SYSTEM FOR STORING STREAMING INFORMATION IN A CIRCULAR BUFFER BY USING PADDING BLOCK CONTAINING NON-STREAMING INFORMATION TO FILL A PARTITION OF THE BUFFER

(75) Inventors: Serge Smirnov, Redmond, WA (US); Mingtzong Lee, Redmond, WA (US); Christopher W. Lorton, Redmond, WA (US); Jayachandran Raja, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 99 days.

(21) Appl. No.: 11/096,791

(22) Filed: Apr. 1, 2005

(65) Prior Publication Data

US 2005/0235113 A1    Oct. 20, 2005

Related U.S. Application Data

(63) Continuation of application No. 10/827,619, filed on Apr. 19, 2004, now Pat. No. 7,089,348, which is a continuation of application No. 09/286,808, filed on Apr. 6, 1999, now Pat. No. 6,748,481.

(51) Int. Cl.
*G06F 12/06* (2006.01)
(52) U.S. Cl. .................... 711/110; 709/251; 710/52
(58) Field of Classification Search ............. 711/110, 711/153, 111, 151, 100; 710/52, 53, 6, 57; 709/251; 370/351, 401
See application file for complete search history.

(56) References Cited

U.S. PATENT DOCUMENTS 4,901,286 A    2/1990    Theus ................... 365/230.01

| 5,136,655 | A | 8/1992 | Bronson ..................... 381/41 |
| 5,339,418 | A | 8/1994 | East et al. .................. 709/300 |
| 5,371,551 | A | 12/1994 | Logan et al. ............... 348/571 |
| 5,371,842 | A | 12/1994 | Easton et al. .............. 395/140 |
| 5,414,455 | A | 5/1995 | Hooper et al. ............. 348/700 |
| 5,463,630 | A | 10/1995 | Tooher ...................... 370/112 |
| 5,566,301 | A | 10/1996 | Koz et al. ................ 395/200.2 |
| 5,568,443 | A | 10/1996 | Dixon et al. ........... 365/230.05 |

(Continued)

FOREIGN PATENT DOCUMENTS

EP    0 633 694 A    1/1995

(Continued)

OTHER PUBLICATIONS

VDOStore-VDOLive Players.Free video streaming client, http://www.clubvdo.net/store/Products/VDOnet/VDOLive_player.asp, May 26, 1998, 5 pages.*

(Continued)

*Primary Examiner*—Pierre-Michel Bataille
(74) *Attorney, Agent, or Firm*—Todd R. Fronek; Westman, Champlin, & Kelly, P.A.

(57) ABSTRACT

One aspect of the present invention relates to an information appliance for handling streaming information for storage in a circular buffer having a plurality of partitions defined by boundaries. The information appliance includes receiving streaming information from a source of streaming information and forming data blocks wherein each data block includes a payload field capable of holding a portion of the streaming information and an identification field indicative of the source of the streaming information. At least one data block is written to the circular buffer to partially fill a partition and at least one padding block is generated having a field indicative of non-streaming information and having a size being a function of remaining space in the partition. The padding block is written to the circular buffer adjacent a boundary of the partition.

8 Claims, 24 Drawing Sheets

U.S. PATENT DOCUMENTS

| | | | |
|---|---|---|---|
| 5,596,581 A | 1/1997 | Saeijs et al. | 370/394 |
| 5,596,645 A | 1/1997 | Fujimori | 381/17 |
| 5,598,276 A | 1/1997 | Cookson et al. | 386/46 |
| 5,664,226 A | 9/1997 | Czako et al. | 395/872 |
| 5,692,213 A | 11/1997 | Goldberg et al. | 395/806 |
| 5,729,471 A | 3/1998 | Jain et al. | 364/514 A |
| 5,754,773 A | 5/1998 | Ozden et al. | 395/200.33 |
| 5,758,011 A | 5/1998 | Fujinami | 386/98 |
| 5,761,417 A | 6/1998 | Henley et al. | 395/200.09 |
| 5,774,643 A | 6/1998 | Lubbers et al. | 395/182.18 |
| 5,784,527 A | 7/1998 | Ort | 386/111 |
| 5,802,394 A | 9/1998 | Baird et al. | 710/5 |
| 5,805,821 A | 9/1998 | Saxena et al. | 395/200.61 |
| 5,835,667 A | 11/1998 | Wactlar et al. | 386/96 |
| 5,838,876 A | 11/1998 | Iwamura | 386/125 |
| 5,850,572 A | 12/1998 | Dierke | 711/109 |
| 5,878,280 A | 3/1999 | Lucht | 395/872 |
| 5,915,094 A | 6/1999 | Kouloheris et al. | 345/327 |
| 5,930,493 A | 7/1999 | Ottesen et al. | 395/500 |
| 5,995,091 A | 11/1999 | Near et al. | 345/302 |
| 6,038,636 A | 3/2000 | Brown, III et al. | 711/103 |
| 6,055,619 A * | 4/2000 | North et al. | 712/36 |
| 6,097,380 A | 8/2000 | Crites et al. | 345/302 |
| 6,134,596 A | 10/2000 | Bolosky et al. | 709/233 |
| 6,172,927 B1 | 1/2001 | Taylor | 365/219 |
| 6,195,680 B1 | 2/2001 | Goldszmidt et al. | 709/203 |
| 6,195,701 B1 | 2/2001 | Kaiserswerth et al. | 709/231 |
| 6,233,389 B1 | 5/2001 | Barton et al. | 386/46 |
| 6,233,629 B1 | 5/2001 | Castellano | 710/29 |
| 6,239,793 B1 | 5/2001 | Barnert et al. | 345/302 |
| 6,247,069 B1 | 6/2001 | Smyers | 710/8 |
| 6,249,319 B1 | 6/2001 | Post | 348/515 |
| 6,260,156 B1 | 7/2001 | Garvin et al. | 714/8 |
| 6,275,899 B1 | 8/2001 | Savell et al. | 711/118 |
| 6,314,466 B1 | 11/2001 | Agarwal et al. | 709/231 |
| 6,324,235 B1 | 11/2001 | Savell et al. | 375/378 |
| 2003/0200548 A1* | 10/2003 | Baran et al. | 725/90 |

FOREIGN PATENT DOCUMENTS

| | | |
|---|---|---|
| EP | 0 702 370 A2 | 3/1996 |
| EP | 0 713 341 A | 5/1996 |
| EP | 0 727 911 A | 8/1996 |
| EP | 0 756 281 A | 1/1997 |
| EP | 0 789 488 A | 8/1997 |
| EP | 0 812 108 A | 12/1997 |
| WO | WO 97 48049 A | 12/1997 |
| WO | WO 20060820 A * | 10/2000 |
| WO | WO 2003007558 A * | 1/2003 |

OTHER PUBLICATIONS

H. Schulzrinne et al., "Real Time Streaming Protocol (RTSP)", Network Working Group, Request for Comments: 2326, Category: Standards Track, Apr. 1998, pp. 1-92.*

Video and Audio: Organization and retrieval in the WWW, http://www.vosaic.com/corp/papers/www5.html, Z. Chen et al., 17 pages, Jul. 12, 1997.*

Kunzman, A.J. et al., 1934 High Performance Serial Bus: The Digital Interface for ATV: IEEE Transactions on Consumer Electronics, US, IEEE Inc., New York, vol. 1, No. 3, pp. 893-900, Aug. 1, 1995.

"Data Rate Matching Buffer", IBM Technical Disclosure Bulletin, IBM Crop., New York, Vo. 29, No. 4, Sep. 1, 1986.

"The Vision Thing", Conference Proceedings, Windows Hardware Engineering Conference, Mar. 25-27, 1998.

Replay Networks, Inc., Press Release, "Replay Networks and Showtime Networks, Inc. Announce Personal TV Deal for Showtime, The Movie Channel, Sundance Channel and FLIX", Mar. 29, 1999, http://www.replaytv.com/news/release_014.html.

Replay Networks, Inc., Press Release, "Replay Networks, Inc. Announces $8 Million Investment with Venture Firm Kleiner Perkins Caufield & Byers as Lead Investor", Mar. 29, 1999, http://www.replaytv.com/news/release_014.html.

Replay Networks, Inc., Press Release, "Replay TV™ Features at David Coursey's Showcase '99", Jan. 28, 1999.

Replay Networks, Inc., Press Release, "Replay Networks, Inc. Announces Backing by Vulcan Ventures" Jan. 7, 1999.

Replay Networks, Inc., Press Release, "Replay Networks, Inc. and Runco Announce Home Theater OEM Agreement", Jan. 7, 1999.

Replay Networks, Inc., Press Release, "Replay Networks Announces Product Line, Pricing, Shipping", Jan. 7, 1999.

Replay Networks, Inc., Press Release, "replay Networks and E? Entertainment Television Networks Sign Agreement to Deliver Content to Replay TV Viewers", Jan. 7, 1999.

Replay Networks, Inc., Press release, "Replay TV Wins CES 199 'Best of Show' Award", Jan. 6, 1999.

Replay Networks, Inc., Press Release, "Replay Networks, Inc. to Start National Service Trails Next Week", Dec. 17, 1998.

Replay Networks, Inc., Press Release, "Replay TV Wins Popular Science 1998 Best of What's New Award", Nov. 11, 1998.

Replay Networks, Inc., Pree Release, "Former Compaq Senior Marketing Exec Kevin Bohren Joins Replay Networks, Inc. Board of Directors", Nov. 9, 1998.

Replay Networks, Inc., Press Release, "Netscape Co-founder Marc Andreessen Joins Replay Networks Board", Nov. 9, 1998.

Replay Networks, Inc., Replay TV™ Reinvents Television and Vows to Viewers, 'You'll Never Miss Your Favorite Shows Again', Sep. 14, 1998, http://www.replaytv.com/news/release_001.html.

Jesse Berst' AnchorDesk, "Replay TV:VCR Death Sentence?", Nov. 3, 1998, http://www.zdet.com/anchordesk/story/story_2703.html.

TiVo, Inc., Press Release, "TiVo Poised to Transform Television Through Debut of Breakthrough Personal TV Service", Dec. 21, 1998. http://www.tivo.com/about/transform.html.

TiVo, Inc., Press Release, "TiVo Debuts Tviews", A Revolutionary Distributed Television Viewing Management Platform for the TV Industry Dec. 21, 1998, http://www.tivo.com/about/debuts.html.

TiVo, Inc., Press Release, "TiVo Inc. and Quantum Corp. Announce Strategic Alliance Enabling Consumers to Take Control of Live Television", Dec. 21, 1998, http://www.tovo.com/about/alliance.html.

TiVo, Inc., Press Release, "TiVo Joins Forces with Philips and DirecTV to Launch Revolutionary Personal Television Service", Jan. 4, 1999, http://www.tivo.com/about/philips.html.

TiVo, Inc., Press Release, "TiVo Inc. Announces Vulcan Ventures Investment", Jan. 7, 1999, http//www.tivo.com/about/vulcan.html.

TiVo, Inc., Press Release, "TiVo Steps Into the Ring with Showtime for *Tyson* vs. *Botha Bout*", Jan. 13, 1999, http://www.tivo.com/about/showtime.html.

TiVo, Inc., Press Release, "TiVo and ZDTV 'Get Networked": Will Pursue Delivery of Cyber-Programming to TiVo'S Personal TV Service, Jan. 26, 1999, http://www.tivo.com/about_012699b.html.

TiVo, Inc., Press Release, "TiVo and the Weather Channel® to Deliver Showcased Programming and Predictions for TiVo PersonalTV Service", Jan. 26, 1999, http://www.tivo.com/about/012699a.html.

TiVo, Inc., Press Release, "TiVo Personalized Television Service Inks Showtime Relationship", Jan. 28, 1999, http://www.tivo.com/about/012899b.html.

TiVo, Inc., Press Release, "TiVo Brings Home HBO Through Agreement Benefiting Personal Television Service Users", Jan. 28, 1999, http://www.tivo.com/about/012899a.html.

TiVo, Inc., Press Release, "Television Industry Embraces TiVo at NATPE", Feb. 2, 1999, http://www.tivo.com/about/020299.html.

TiVo, Inc., Press Release, "TiVo to Hightlight 'Broadband' TiVo Services at Demo '99 ", Feb. 8, 1999, http://www.tivo.com/about/020899.html.

TiVo, Inc., Press Release, "TiVo Inc. and General Motors Announce Charter Advertising Partner Agreement", Feb. 16, 1999, http://www.tivo.com/about/021699.html.

TiVo, Inc., Press Release, "TiVo and the Weather Channel® to Deliver Showcased Programming nad Predictions for TiVo Personal TV Service", Jan. 26, 1999, http://www.tivo.com/about/032999.html.

TiVo, Inc., Press Release, "TiVo and Showtime Networks Bolster Relationship, Announce New Equity Investment", Mar. 30, 1999, http://www.tivo.com/about/033099.html.

TiVo, Inc., Press Release, "TiVo and Philips Deliver First Personal Television System", Mar. 31, 1999, http://www.tivo.com/about/033199.html.

"Correlating Audio and Moving-Image Tracks", IBM Technical Disclosure Bulleting, vol. 33, No. 10A, pp. 295-296, Mar. 1, 1991.

Abstract of "An Intelligent Media Browser Using Automatic Multimodel Analysis", by Foote et al., Proc. 6th, MultiMedia Conference, pp. 375-380, Sep. 12-16, 1998, "Inspec Online!", Institution of Electrical Engineers, Stevenage, GB, Inspec No. AN 6287986.

"Intelligent Access to Digital Video: Information Project", Wactlar et al., IEEE Computer Society, vol. 29, No. 5, pp. 46-52; May 1, 1996.

\* cited by examiner

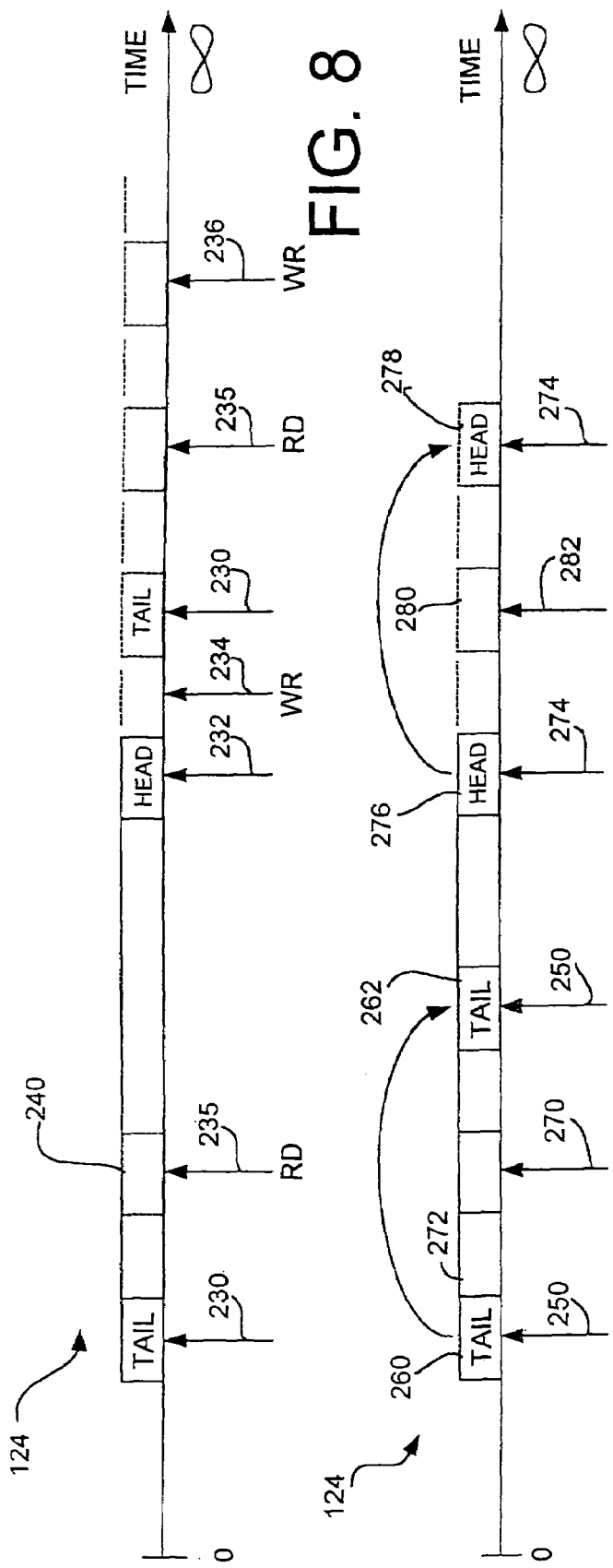

| STREAMER ID | | RESERVED | | | | | |
|---|---|---|---|---|---|---|---|
| 31 | | 28 27 | | | | | 24 |
| RESERVED | | | | | | | |
| 23 | | | | | | | 16 |
| RESERVED | | | | UOP10 | UOP9 | | UOP8 |
| 15 | | | | 11 10 | 9 | | 8 |
| UOP7 | UOP6 | UOP5 | UOP4 | UOP3 | UOP2 | UOP1 | UOP0 |
| 7 | 6 | 5 | 4 | 3 | 2 | 1 | 0 |

| UOP BIT | USER OPERATION |
|---|---|
| UOP0 | PLAY |
| UOP1 | PAUSE |
| UOP2 | STOP |
| UOP3 | FORWARD-SCAN |
| UOP4 | BACKWARD-SCAN |
| UOP5 | SEEK-TO-BEGINNING |
| UOP6 | SEEK-TO-END |
| UOP7 | SEEK-TO-POSITION |
| UOP8 | GET-POSITION |
| UOP9 | START-ARCHIVE |
| UOP10 | GET-MARKER |

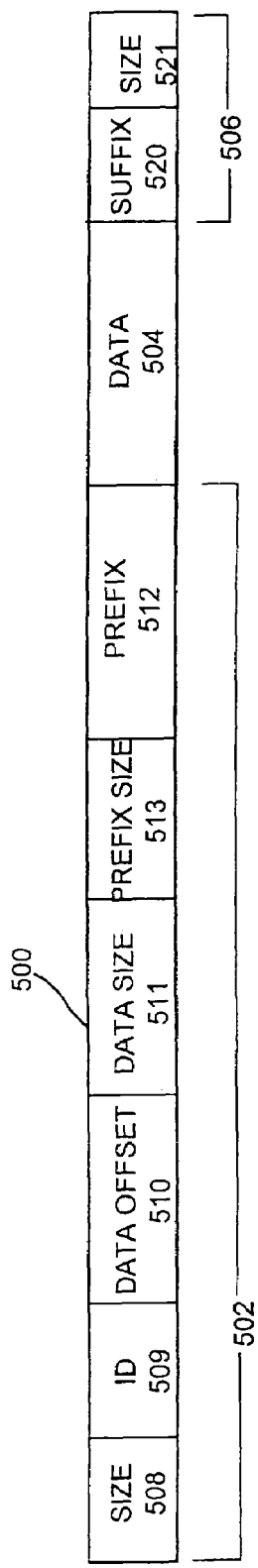
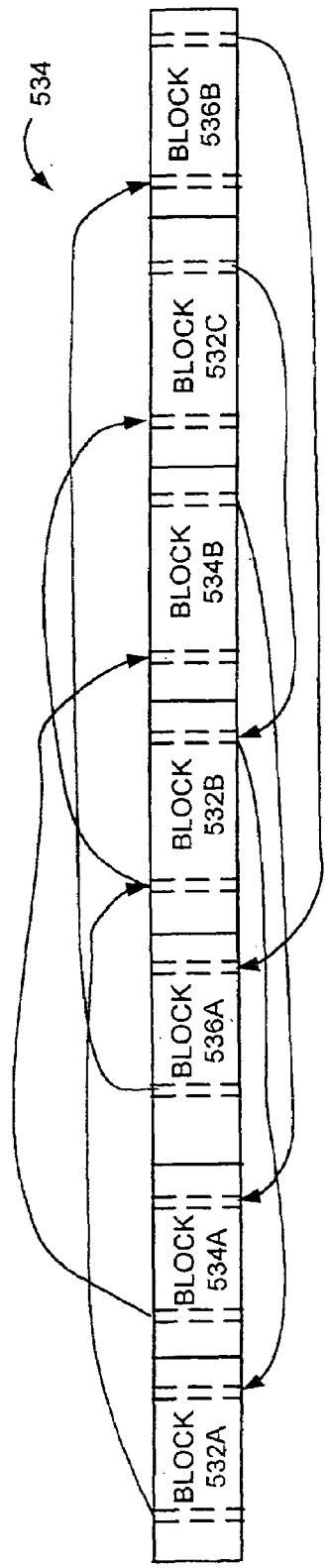
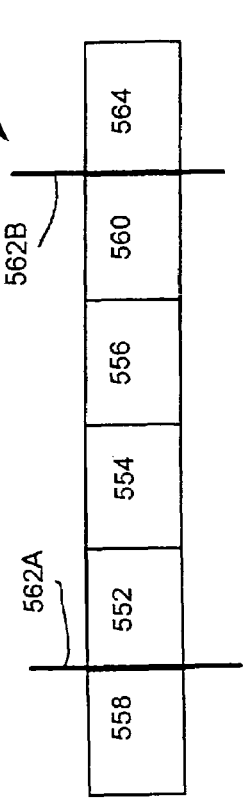
FIG.17
FIG.18
FIG.19

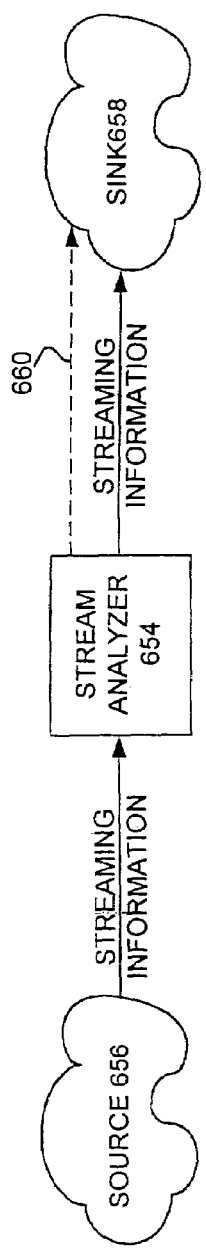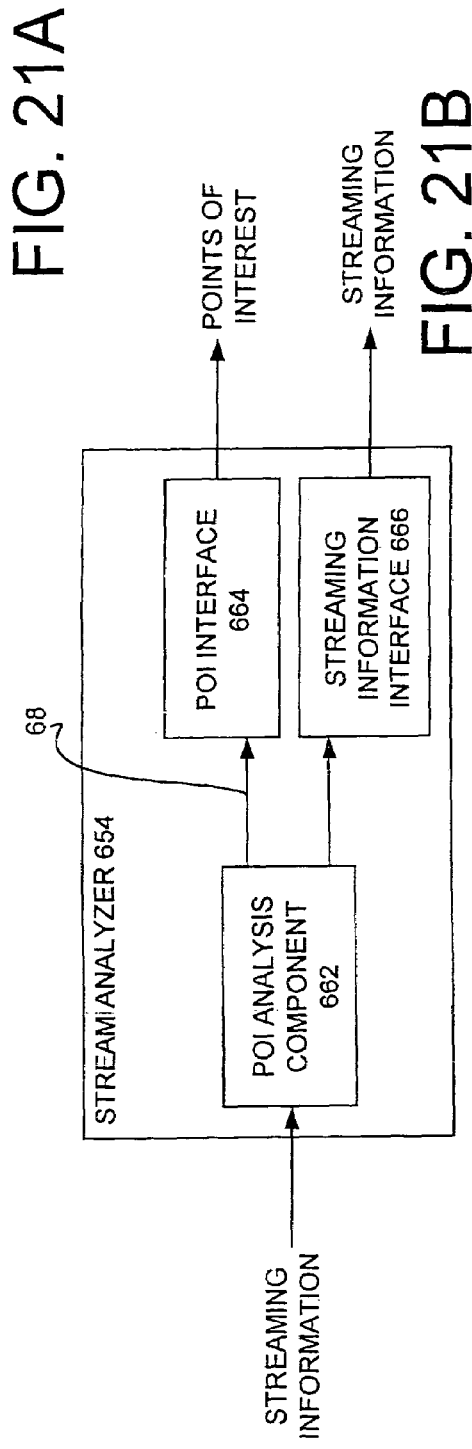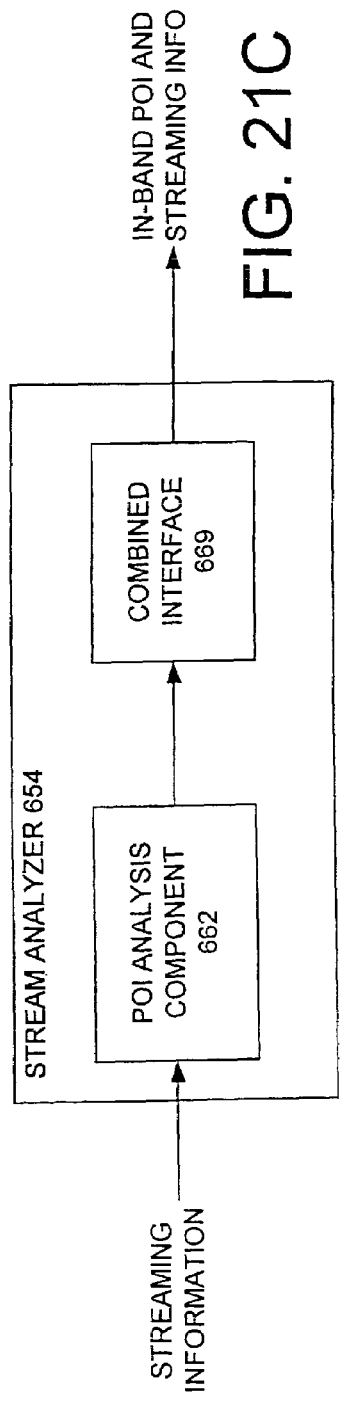

SYSTEM FOR STORING STREAMING INFORMATION IN A CIRCULAR BUFFER BY USING PADDING BLOCK CONTAINING NON-STREAMING INFORMATION TO FILL A PARTITION OF THE BUFFER

CROSS REFERENCE TO PENDING APPLICATION

The present application is a continuation of and claims priority of U.S. patent application Ser. No. 10/827,619, filed on Apr. 19, 2004, now U.S. Pat. No. 7,089,348 which is a continuation of U.S. patent application Ser. No. 09/286,808, filed Apr. 6, 1999 now U.S. Pat. No. 6,748,481; the contents of both aforementioned applications are hereby incorporated by reference in their entirety.

BACKGROUND OF THE INVENTION

The present invention relates to streaming information. More particularly, the present invention relates to recording streaming information and retrieving the stored information for selective playback.

With advances in technology including faster processors, improved graphics, and so forth, a desktop computer can easily receive and present streaming information to the user. Common examples of streaming information include streaming video and audio delivered over a wide area network, such as the Internet. For instance, television broadcast signals that would otherwise be transmitted wirelessly using satellites, television transmitters, etc., are encoded and made available for transmission to remote computer users via the Internet. Upon request by the desktop computer user, the encoded data packets containing audio and video data are sent to the desktop computer user sequentially. Upon receipt, the data packets are decoded and processed by the desktop computer in order to render the streaming information to the user in as close to real time as possible. After rendering or presentation, the data packets are discarded.

Although processing streaming information in the manner described above is useful, there exist a number of shortcomings. Currently, streaming information is provided at the request of each desktop computer. Thus, each user must form a separate connection with the source of streaming information in order to receive the desired streaming information. Once initiated, the user is unable to control the manner in which streaming information is rendered. For instance, the user cannot temporarily "pause" the incoming streaming information in order to perform another task and then resume viewing when desired. Likewise, the user is unable to repeat a previously rendered portion since the data packets are discarded, or skip ahead since the data packets have not been received.

There thus is an ongoing need to improve the manner in which streaming information is rendered. Although described above with respect to a desktop computer and streaming information received from the Internet, the improved process should be applicable to other information appliances or computing devices and other forms of streaming information.

SUMMARY OF THE INVENTION

One aspect of the present invention relates to an information appliance for handling streaming information for storage in a circular buffer having a plurality of partitions defined by boundaries. The information appliance includes receiving streaming information from a source of streaming information and forming data blocks wherein each data block includes a payload field capable of holding a portion of the streaming information and an identification field indicative of the source of the streaming information. At least one data block is written to the circular buffer to partially fill a partition and at least one padding block is generated having a field indicative of non-streaming information and having a size being a function of remaining space in the partition. The padding block is written to the circular buffer adjacent a boundary of the partition.

Another aspect of the present invention relates to an information appliance for handling streaming information for storage in a circular buffer comprising a plurality of partitions defined by boundaries. The information appliance performs steps to handle the streaming information that includes receiving streaming information from a source of streaming information and forming similarly structured data blocks wherein each data block includes a payload field capable of holding a portion of the streaming information and an identification field indicative of the source of the streaming information. At least two data blocks are written to the circular buffer to partially fill a partition and at least one padding block having a field indicative of non-streaming information and having a size being a function of remaining space in the partition. Said at least one padding block is written to the circular buffer to fill the remaining space in the partition.

BRIEF DESCRIPTION OF THE DRAWINGS

FIG. 8 is a diagram illustrating the circular buffer 124 along a linear time line.

FIG. 10 is a diagram illustrating advancement of a Tail Pointer variable within the circular buffer.

FIG. 12 is a diagram illustrating an example of the circular buffer when a reader module has overtaken a writer module.

FIG. 17 is a pictorial representation of a data block.

FIG. 18 is a pictorial representation of a first sequence of data blocks.

FIG. 19 is a pictorial representation of a second sequence of data blocks.

FIGS. 21A–21D are block diagrams illustrating stream analysis.

FIGS. 22–23C are flow diagrams illustrating stream analysis.

DETAILED DESCRIPTION OF THE ILLUSTRATIVE EMBODIMENTS

Overview

Figure 1:
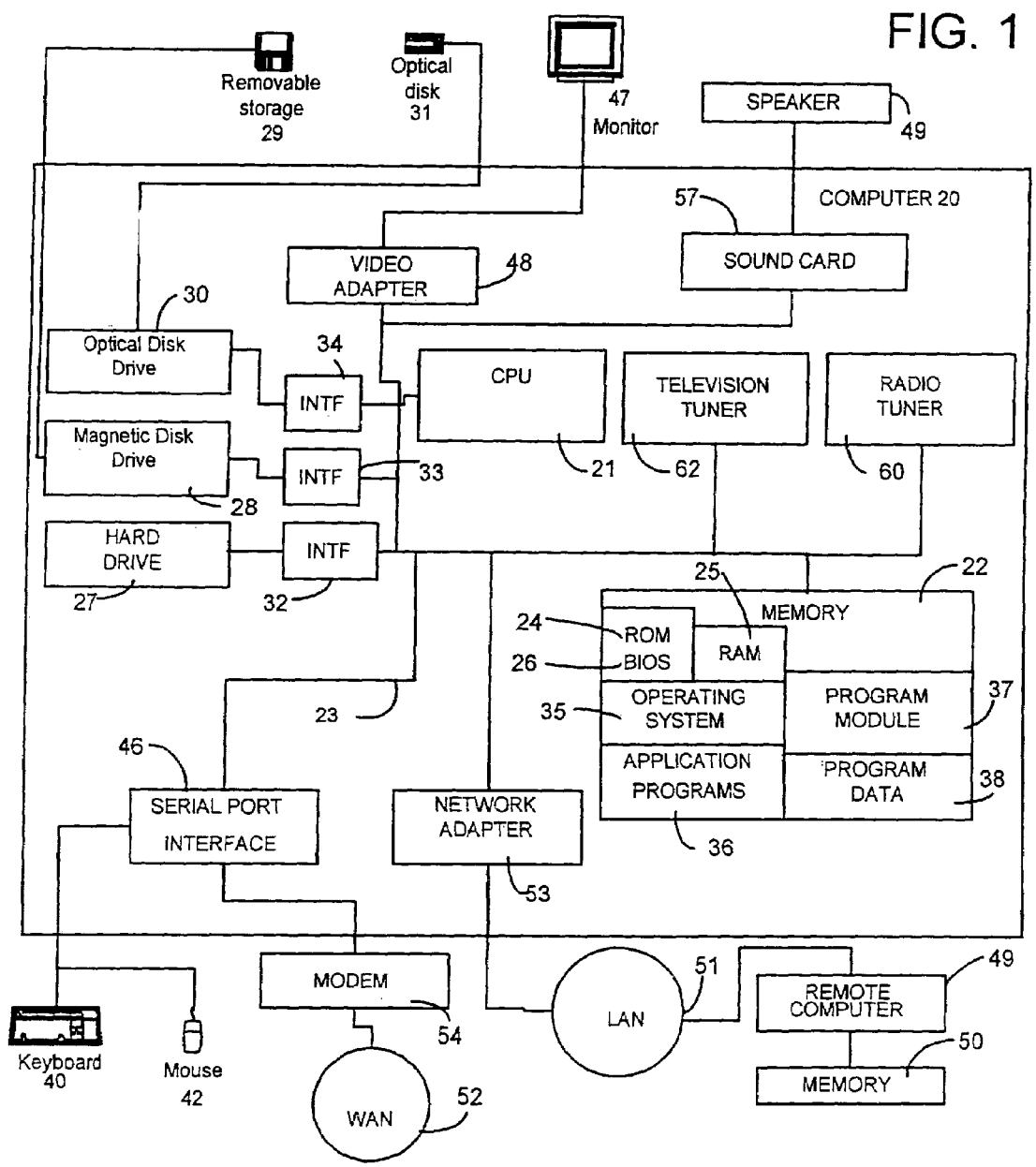
FIG. 1 is a block diagram of a first exemplary environment for the present invention.

FIG. 1 and the related discussion are intended to provide a brief, general description of a first exemplary computing environment in which the invention may be implemented. Although not required, the invention will be described, at least in part, in the general context of processor executable instructions, such as program modules being executed by a controller, processor, a personal computer or other computing device. Generally, program modules include routine programs, objects, components, data structures, etc., that perform particular tasks or implement particular abstract data types. Tasks performed by the program modules are described below and with the aid of block diagrams and flowcharts. Those skilled in the art can implement the description, block diagrams and flowcharts to processor executable instructions, which can be written on computer readable mediums. In addition, those skilled in the art will appreciate that the invention may be practiced with other information appliances, including hand-held devices, multiprocessor systems, microprocessor-based or programmable consumer electronics, network PCs, minicomputers, mainframe computers, and the like. The invention is also applicable in distributed computing environments where tasks are performed by remote processing devices that are linked through a communications network. In a distributed computing environment, program modules may be located in both local and remote memory storage devices.

With reference to FIG. 1, the first exemplary environment for the invention includes a general purpose computing device in the form of a conventional personal computer 20, including processing unit 21, a system memory 22, and a system bus 23 that couples various system components including the system memory to processing unit 21. System bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within personal computer 20, such as during start-up, is stored in ROM 24. Personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical medium. Hard disk drive 27, magnetic disk drive 28, and optical disk drive 30 are connected to system bus 23 by a hard disk drive interface 32, magnetic disk drive interface 33, and an optical drive interface 34, respectively. The drives and the associated computer readable medium provide nonvolatile storage of computer readable instructions, data structures, program modules and other data for personal computer 20.

Although the exemplary environment described herein employs a hard disk, a removable magnetic disk 29 and a removable optical disk 31, it should be appreciated by those skilled in the art that other types of computer readable medium which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on hard disk, magnetic disk 29, optical disk 31, ROM 24 or RAM 25, including an operating system 35, one or more application programs 36, other program modules 37, and program data 38. A user may enter commands and information into personal computer 20 through input devices such as a keyboard 40 and pointing device (mouse) 42. Other input devices (not shown) may include a microphone, joystick, game pad, satellite dish, scanner, or the like. These and other input devices are often connected to processing unit 21 through a serial port interface 46 that is coupled to system bus 23, but may be connected by other interfaces, such as a sound card, a parallel port, a game port or a universal serial bus (USB). A monitor 47 or other type of display device is also connected to system bus 23 via an interface, such as a video adapter 48. In addition to monitor 47, personal computers may typically include other peripheral output devices such as a speaker 49 connected to a sound card 57 and printers (not shown).

Personal computer 20 may operate in a networked environment using logic connections to one or more remote computers, such as a remote computer 49. Remote computer 49 may be another personal computer, a server, a router, a network PC, a peer device or other network node, and typically includes many or all of the elements described above relative to personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets and the Internet.

When used in a LAN networking environment, personal computer 20 is connected to local area network 51 through a network interface or adapter 53. When used in a WAN networking environment, personal computer 20 typically includes a modem 54 or other means for establishing communications over wide area network 52, such as the Internet. Modem 54, which may be internal or external, is connected to system bus 23 via serial port interface 46. In a network environment, program modules depicted relative to personal computer 20, or portions thereof, may be stored in the remote memory storage devices. It will be appreciated that the network connections shown are exemplary and other means of establishing a communications link between the computers may be used.

Streaming information can be received by computer 20 using a number of known methods and technologies. Commonly, a source of streaming information is a remote computer wherein computer 21 is connected to the remote computer using a wired or wireless modem. This technique is used often when streaming information is provided through an intranet or the Internet, typically in digital form. Digital streaming information can further comprise satellite signals received by a satellite receiver, dish or the like.

However, streaming information can also arrive as analog signals. For instance, the streaming information can also comprise broadcast radio or television signals. In such cases, computer 20 includes a radio tuner 60 and a television tuner 62 to receive the broadcast signals and convert the analog signals to digital form for transmission over system bus 23.

Figure 2:
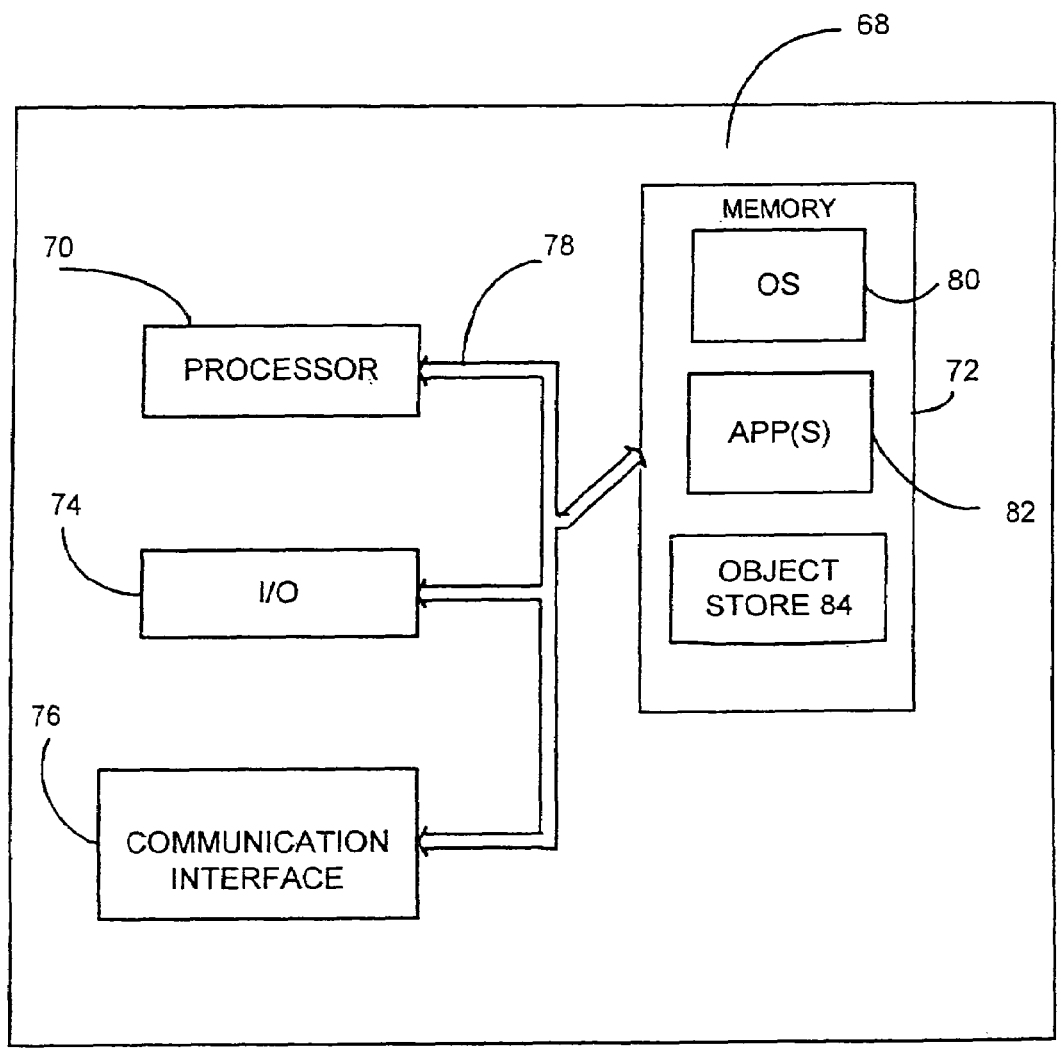
FIG. 2 is a block diagram of a second exemplary environment for the present invention.

It should be understood that the present invention can be used in other computing devices besides computer 20, discussed above. FIG. 2 is a block diagram of a mobile device 68, which is another exemplary computing environment. Mobile device 68 includes a microprocessor 70, memory 72, input/output (I/O) components 74, a communication interface 76 for communicating with, for example, computer 20. In a one embodiment, the afore-mentioned components are coupled for communication with one another over a suitable bus 78.

Memory 72 is implemented as non-volatile electronic memory such as random access memory (RAM) with a battery back-up module (not shown) such that information stored in memory 72 is not lost when the general power to mobile device 68 is shut down. A portion of memory 72 is preferably allocated as addressable memory for program execution, while another portion of memory 72 is preferably used for storage, such as to simulate storage on a disc drive.

Memory 72 includes an operating system 80, an application program 82 as well as an object store 84. During operation, operating system 80 is preferably executed by processor 70 from memory 72. Operating system 80, in one preferred embodiment, is a "WINDOWS CE" brand operating system commercially available from Microsoft Corporation. Operating system 80 is preferably designed for mobile devices, and implements database features which can be utilized by application 82 through a set of exposed application programming interfaces and methods. The objects in object store 84 are maintained by application 82 and operating system 80, at least partially in response to calls to the exposed application programming interfaces and methods.

Communication interface 76 represents numerous devices and technologies that allow mobile device 68 to receive streaming information. The devices are similar to those discussed above with respect to computer 20 and include wired and wireless modems, satellite receivers and broadcast tuners to name a few. Mobile device 68 can also be directly connected to computer 20 to exchange data therewith. In such cases, communication interface 76 can be an infrared transceiver or a serial or parallel communication connection, all of which are capable of transmitting streaming information.

Figure 3:
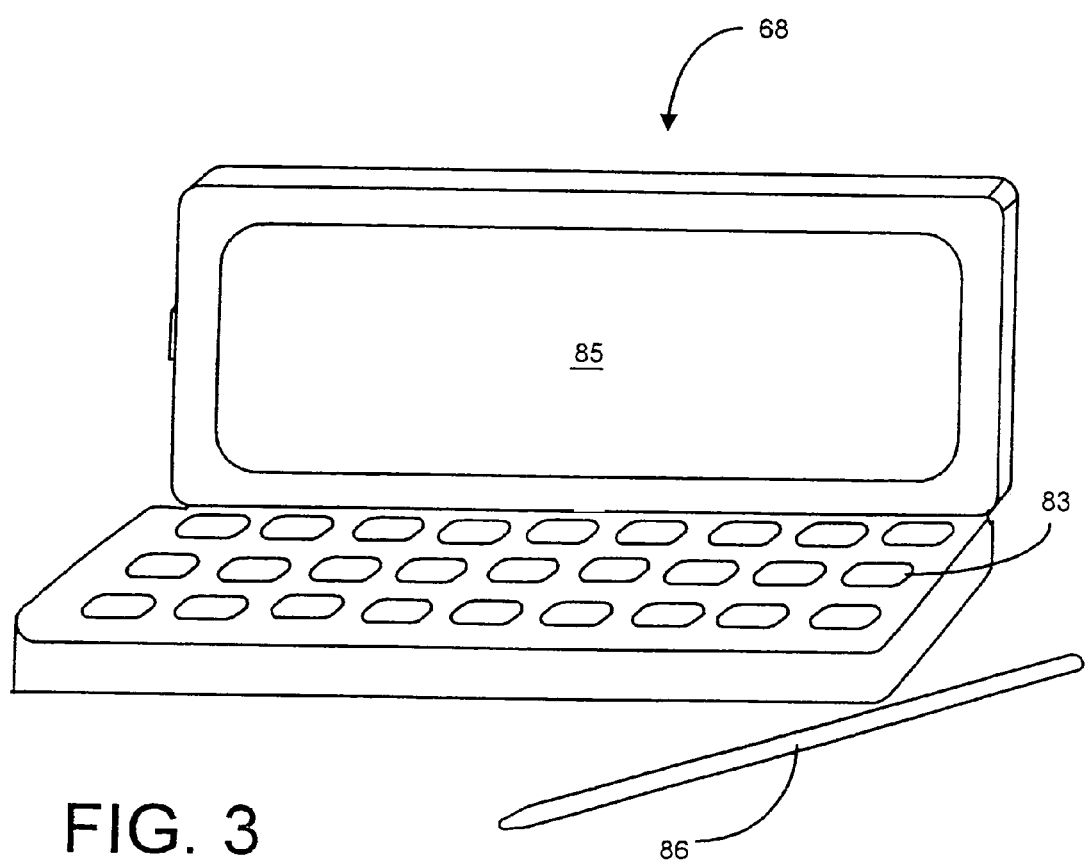
FIG. 3 is a perspective view of a mobile device.

FIG. 3 is a simplified pictorial illustration of mobile device 68. Mobile device 68 can be a desktop assistant sold under the designation H/PC having software provided by the Microsoft Corporation. In one embodiment, mobile device 18 includes a miniaturized keyboard 83, display 85 and stylus 86. In the embodiment shown in FIG. 3, display 85 is a liquid crystal display (LCD) which uses a contact sensitive display screen in conjunction with stylus 86. Stylus 86 is used to press or contact display 85 at designated coordinates to accomplish certain user input functions. Miniaturized keyboard 83 is preferably implemented as a miniaturized alpha-numeric keyboard, with any suitable and desired function keys, which are provided for accomplishing certain user input functions. In other known embodiments, keyboard 83 is omitted and a "soft" keyboard is provided through the contact sensitive display screen. In yet other embodiments, a character recognition module is employed to recognize characters written on the contact sensitive display screen using stylus 86.

Figure 4:
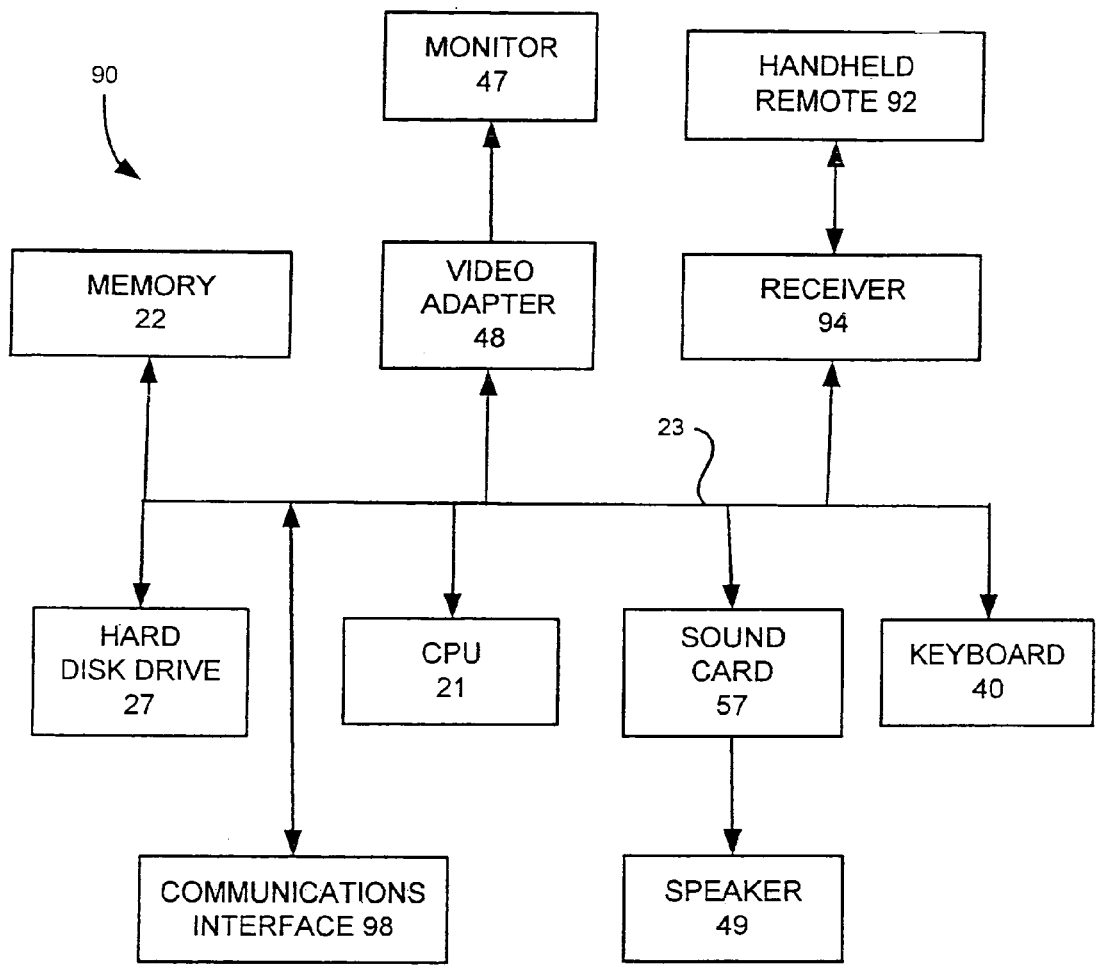
FIG. 4 is a block diagram of a third exemplary environment for the present invention.

FIG. 4 illustrates yet another exemplary environment in which the present invention can operate. In FIG. 4, an entertainment appliance 90 is illustrated and includes processing unit 21, system memory 22 and system bus 23. Hard disk drive 27, or any of the other storage devices described above, are further coupled to system bus 23 and used for temporary and permanent storage of program applications, data, etc. Unlike typical desktop computers such as computer 20 described above, entertainment appliance 90 may use a limited input device such as a handheld remote 92 operable with a receiver 94, which can be an infrared receiver, wireless receiver, or the like. In entertainment appliance 90, information is rendered to the user using monitor 47 or other display device that is coupled to system bus 23 with video adapter 48. Audio information is also rendered and illustrated herein with speaker 49. Speaker 49 is coupled to system bus 23 with sound card 57, which can be combined with video adapter 48 to form a signal device, if desired. It should be further understood that audio and video information could be provided to external components, such as amplifiers or the like, which in turn, are connected to monitor 47 and speakers 49.

Streaming information is provided to entertainment appliance 90 through a communications interface 98. Communications interface 98 can be any of the devices and technologies described above with respect to the two previous environments.

Delay Filter

Figure 5:
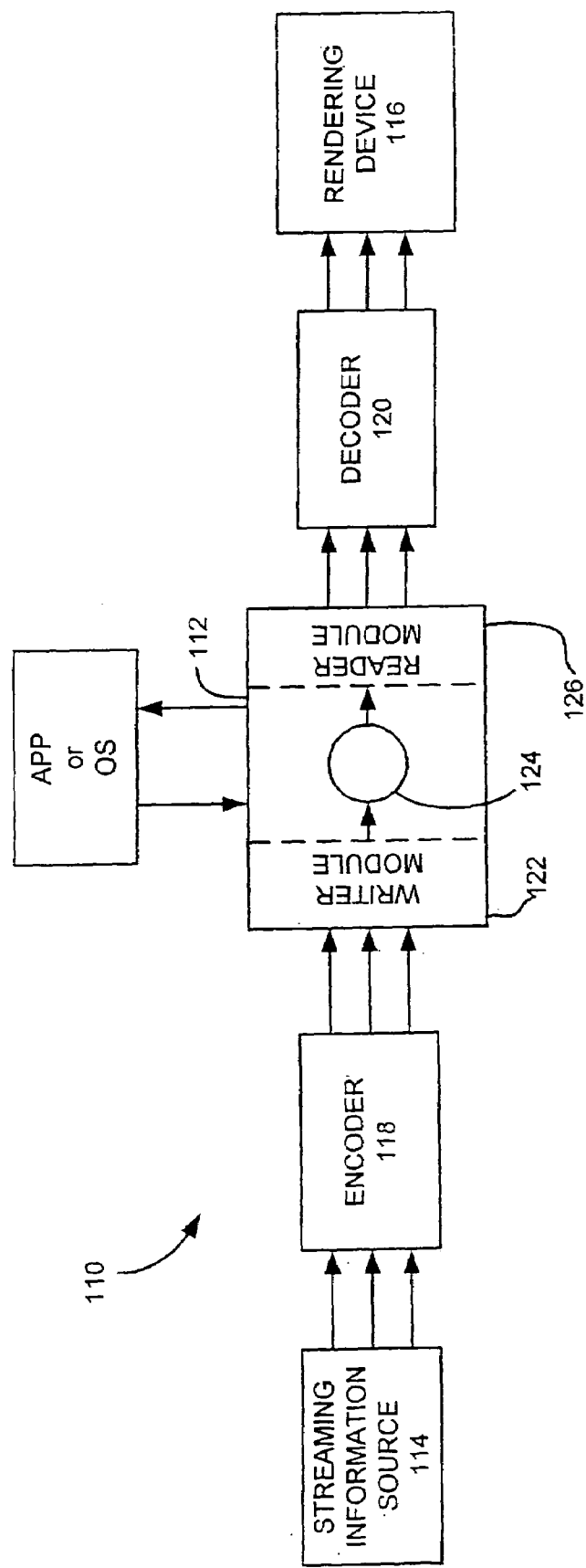
FIG. 5 is a system for processing streaming information.

FIG. 5 is a general block diagram illustrating a system 110 for processing streaming information. System 110 includes a delay filter 112 for temporarily storing streaming information received from a streaming information source 114. Delay filter 112 is further coupled to a rendering device or devices 116 to render streaming information upon request by the user. Also illustrated in FIG. 5 is an encoder 118 and a decoder 120. Although not required, encoder 118 and decoder 120 can improve system performance wherein encoder 118 receives streaming information source 114 and compresses the streaming information prior to transfer and storage in delay filter 112. Decoder 120 receives the streaming information temporarily stored in delay filter 112 in the compressed format and uncompresses the streaming information prior to transferring the streaming information to rendering device 116.

At this point, it should be noted that system 110 can be operated in any of the computing environments described above, or similar computing environments. Those skilled in the art will appreciate that delay filter 112, rendering device 116, encoder 118 and decoder 120 can be implemented in hardware, software, or combinations thereof. In one embodiment by way of example, delay filter 112 is embodied in the operating system. Higher level application programs or other portions of the operating systems can access functions of delay filter 112 using application program interfaces (APIs) as is well known in the art.

In operation, streaming information source 114 provides an information stream to delay filter 112 (optionally through encoder 118). Generally, the streaming information comprises digital data representing one or more channels of content information. For instance, streaming information source 114 can comprise an Intranet or the Internet available through the communication interfaces described above. Likewise, streaming information source 114 can comprise an analog or digital television tuner wherein separate audio, video and data (e.g. closed captioning) information streams comprise a single channel. Other sources of streaming information include, but are not limited to, audio tuners, satellite receivers and the like.

In the embodiment illustrated, encoder 118 receives the streaming information and encodes or compresses the streaming information into a known format such as "MPEG", "AVI", "MOV" (Apple®QuickTime®) and "WAV", although, if used, the present invention is not limited to any one particular encoding format.

Generally, as discussed below, delay filter 112 includes a writer module 122, a circular buffer 124 and one or more reader modules 126. Writer module 122 receives the streaming information provided by streaming information source 114 and writes the streaming information into circular buffer 124. Circular buffer 124 can comprise any of the storage devices described above, for example, hard disk 27 or RAM memory. Reader module 126 accesses circular buffer 124 to retrieve the streaming information when the streaming information is to be rendered. If the streaming information stored in circular buffer 124 is encoded or compressed, decoder 120 decodes or uncompresses the streaming information, which is then provided to rendering device 116.

Figure 6:
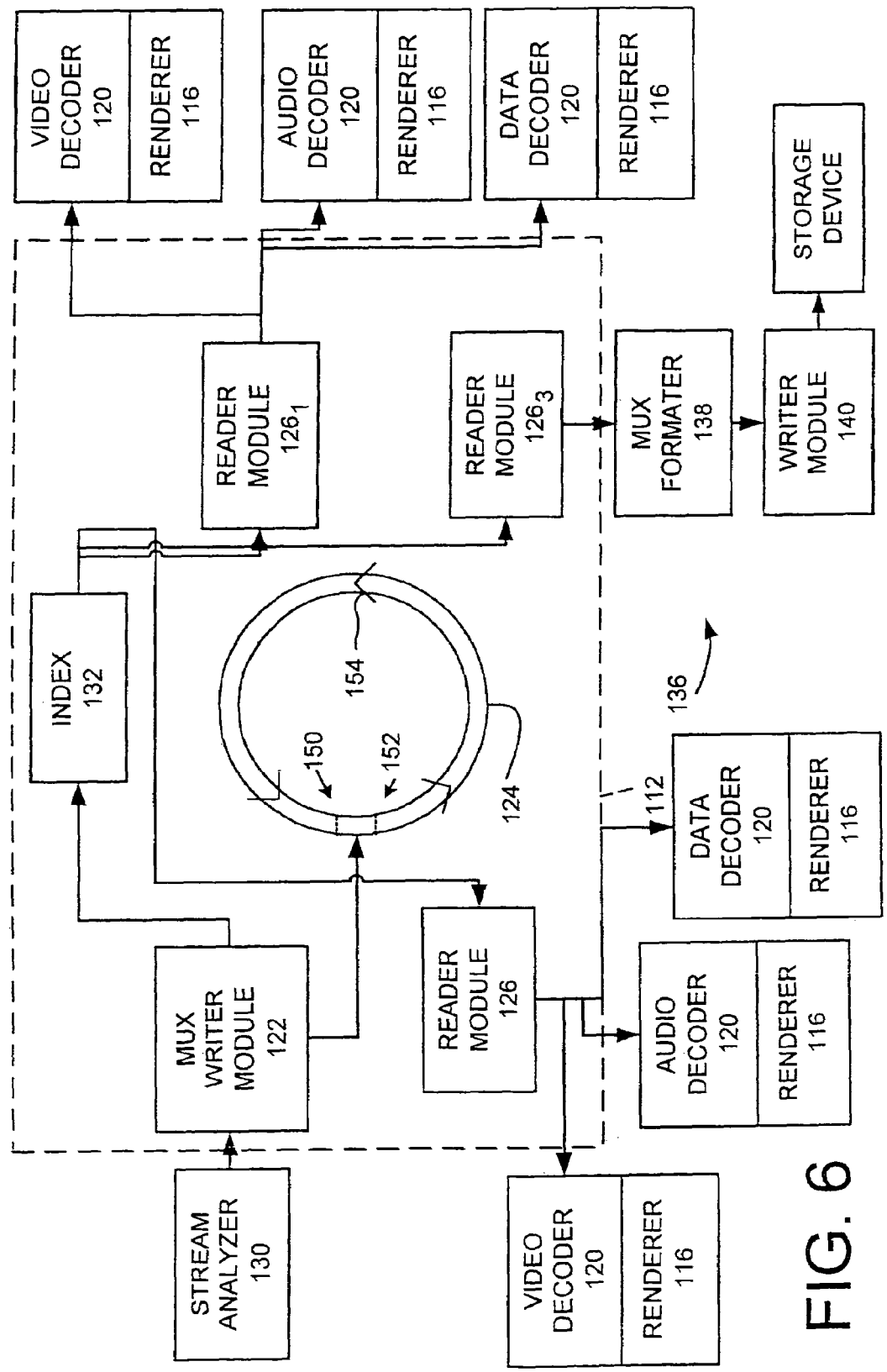
FIG. 6 is a block diagram of a delay filter.

FIG. 6 is a more detailed pictorial representation of delay filter 112. In this illustrated embodiment, the streaming information comprises a television signal or channel that includes audio, video and data (closed captioning) streams. The streaming information is first provided to a stream analyzer 130, which analyzes the incoming streams and provides such information as synchronization points that may be present in each of the streams. Synchronization points are used in rendering some types of streaming information and are discussed in detail below.

Streaming information and synchronization point information is provided to writer module 122. In one embodiment, as illustrated, writer module 122 comprises a mux writer that receives multi-stream streaming information for storage in circular buffer 124. As indicated above, one or more reader modules 126 (herein labeled as $126_1$, $126_2$ and $126_3$) are provided to read the streaming information from circular buffer 124 for rendering. Writer module 122 stores synchronization information in an index 132. Reader modules 126 may access index 132 in order to locate a particular portion of the streaming information and properly render the streaming information. Operation of writer module 122, circular buffer 124, reader modules 126 and index 132 are discussed in detail below.

In the embodiment illustrated, two separate playback reader modules $126_1$ and $126_2$ are illustrated having outputs that provide streaming information to separate video, audio and data decoders 120 and rendering devices 116. In general, this illustrates that separate reader modules 126 can be reading streaming information from circular buffer 124 at different points in circular buffer 124, and thus, represents separate individuals accessing the data stored therein. In addition, other reader modules 126, such as indicated at 136, can be implemented to archive and store the streaming information in circular buffer 124 for later viewing. Generally, in archiving system 136, reader module $126_3$ provides streaming information to a mux formatter 138 that, in turn, provides the information to a writer module 140 for storage in any of the storage devices indicated above such as hard disk 27.

Circular Buffer

Referring back to circular buffer 124, circular buffer 124 has "floating" beginning and ending points, which are referred to as a logical "head" 150 and "tail" 152. Head 150 corresponds to the logical head of valid data in circular buffer 124, and tail 152 corresponds to the logical tail of valid data in circular buffer 124. Writer module 122 always writes to the head of buffer 124, which moves circularly through the buffer in the direction of arrow 154. Buffer 124 therefore always has a fixed maximum time quantum of data available for reading. For example, when time shifting multimedia (e.g., audio and video) content, writer module 122 receives the streaming multimedia information and stores the information in circular buffer 124. The user views the stored multimedia content through one of the readers modules 126. The circular structure of buffer 124 allows some portion of the streaming information to be available for the user to "instant replay" or "pause" on demand, for example, without allowing the buffer to "fill-up" with "time-shifted" data. Circular buffer 124 can be implemented in volatile or non-volatile memory, such as random access memory (RAM), a hard disk, a floppy disk or an optical disk. In one embodiment, circular buffer 124 is implemented in hard disk drive 27.

Figure 7:
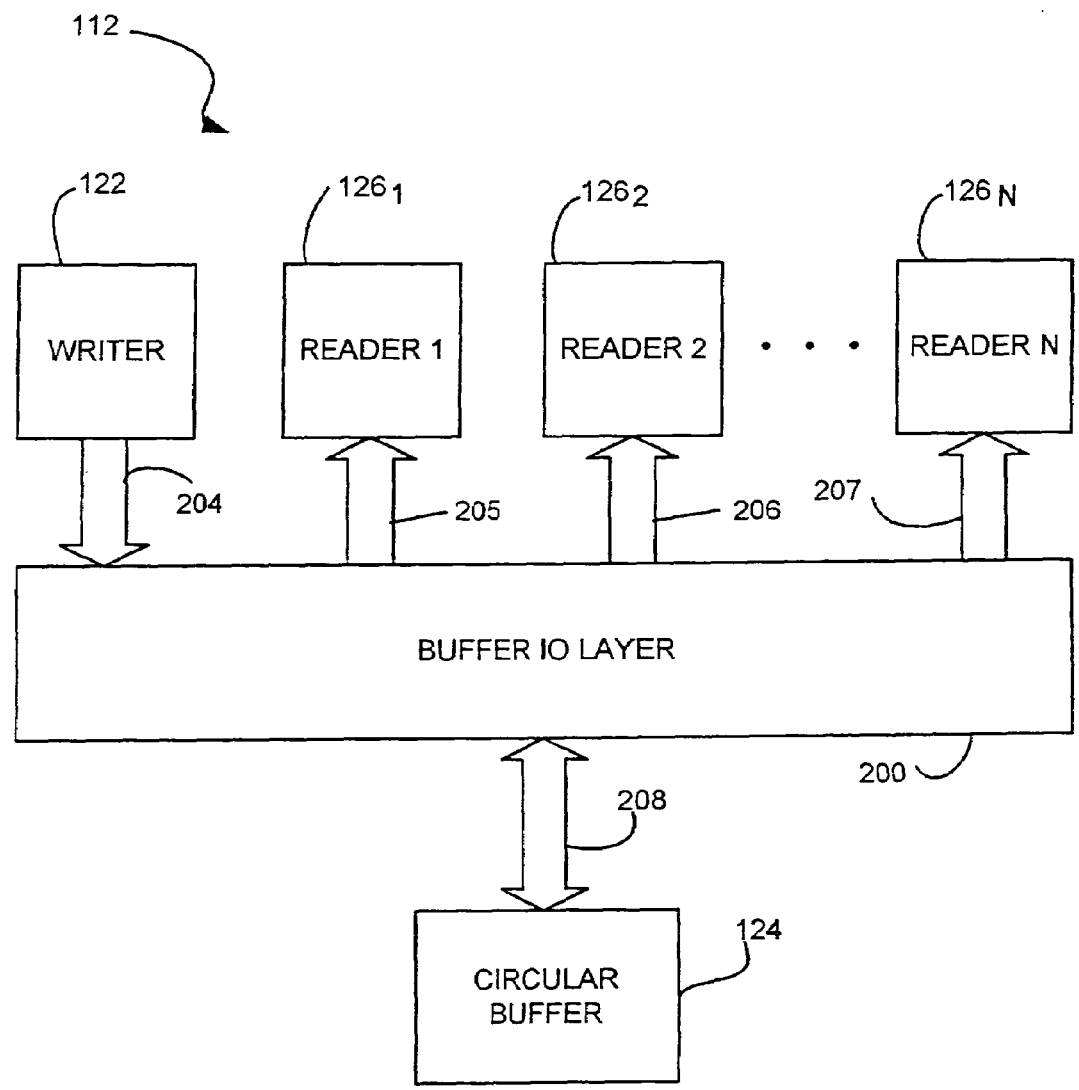
FIG. 7 is a block diagram of delay filter 112 showing an interface to a circular buffer in the filter.

FIG. 7 is a block diagram of delay filter 112 showing an interface to circular buffer 124. Buffer IO layer 200 interfaces between circular buffer 124 and the clients of the buffer, which include writer module 122 and reader modules 126 (labeled $126_1$–$126_N$, where N is an integer variable greater than or equal to 1). Buffer IO layer 200 implements the circularity of buffer 124 and synchronizes writer module 122 with reader modules $126_1$–$126_N$. Buffer IO layer 200 implements circularity by translating between logical addresses, used at upper interfaces 204–207 to identify logical positions within buffer 124, and physical (wrap around) addresses, used at lower interface 208 for identifying particular physical addresses within buffer 124. The logical addresses always increase (or decrease) with time and never wrap around. The logical addresses can be periodically reset as desired. The physical addresses wrap around (i.e. wrap from the highest address of the buffer to the lowest address of the buffer) at a frequency determined by the circular buffer size. As each successive block of the streaming information is received by writer module 122, the block is associated with a respective logical address or a range of logical addresses, which increases with each successive block. Buffer IO layer 200 translates the logical addresses into corresponding physical addresses which are used to access circular buffer 124. In one embodiment, buffer IO layer 200 translates the logical addresses into physical addresses as a function of the logical address modulo the buffer size (i.e. the number of storage locations in circular buffer 124). Buffer layer IO 200 can be implemented in an operating system, for example.

Write/Read Synchronization

Since writer module 122 and reader modules $126_1$–$126_N$ can operate independently of one another and at different data rates, buffer IO layer synchronizes writer module 122 and reader modules $126_1$–$126_N$ to maintain a predetermined temporal order between writing and reading. In one embodiment, buffer IO layer 200 prevents any reader $126_1$–$126_N$ from reading data that is not yet logically available and prevents writer module 122 from overwriting data that is in the process of being read by one or more of the reader modules $126_1$–$126_N$. In circular buffer 124, a given physical position corresponds to multiple logical positions. Without synchronization, a reader module that is trailing writer module 122 by a distance that is close to the buffer size may be reading from the same physical area to which writer module 122 is writing. Buffer IO layer 200 also allows reader modules $126_1$–$126_N$ to follow writer module 122 as close as possible to minimize latency.

Buffer IO layer 200 implements a synchronization algorithm for writer module 122 and reader modules $126_1$–$126_N$. Each time writer module 122 wants to pass data to buffer IO layer 200, its corresponding application calls the synchronization algorithm. Similarly, each time one of the reader modules $126_1$$126_N$ wants to read data from buffer IO layer 200, its corresponding application calls the synchronization algorithm. The synchronization algorithm can be implemented in hardware, software, or a combination of both, as desired.

The synchronization algorithm uses "blocking" to (1) block a reader module $126_1$–$126_N$ that is trying to read data which has not yet been written and/or (2) block writer module 122 if it is trying to write to an area of circular buffer 124 from which one of the reader modules $126_1$–$126_N$ is currently reading. In both cases, one component is blocked until another component has completed the operation necessary to remove the offending condition. For example, if writer module 122 is blocked, it remains blocked until all of the reader modules $126_1$–$126_N$, which who are reading from the area to be written, have completed their reads. When a reader module is blocked, it remains blocked until writer module 122 has written all of the data requested by that reader module.

The synchronization algorithm uses a plurality of shared variables. Each client has its own set of variables which are shared with the other clients. In FIG. 8, circular buffer 124 is arranged along a linear time line from zero to infinity. The synchronization algorithm maintains a "Tail Pointer" 230 which is an integer variable indicating the logical tail of valid data in circular buffer 124. A "Head Pointer" 232 is an integer variable which indicates the logical head of valid data in circular buffer 124. For a read operation to succeed, the logical read position within circular buffer 124 must be greater than or equal to Tail Pointer 230 and less than or equal to Head Pointer 232. Since buffer 124 is circular, the logical position of Tail pointer 230 is also logically "ahead" of the logical position of Head Pointer 232.

When writer module 122 issues a write command, it specifies an area in buffer 124 to be written, starting at a present write position 234. A "Writer Blocked On" integer variable 236 is used to identify the logical position corresponding to the end of the data to be written when all or part of the area to be written is blocked by one or more of the reader modules $126_1$–$126_N$. The Writer Blocked On variable is set when one of the reader modules $126_1$–$126_N$ is currently reading from that area. For example, a reader module may be presently reading from logical position 235, which is in the area between positions 234 and 236. A "zero" value for the "Writer Blocked On" variable indicates that writer module 122 is not currently blocked by any of the reader modules $126_1$–$126_N$.

A "Currently Reading From" integer variable is maintained for each reader module $126_1$–$126_N$. The Currently Reading From variable is used to indicate that the reader module is currently performing a read that starts at this logical position in circular buffer 124. For example, in FIG. 8, a reader module is currently reading from logical position 235 in circular buffer 124. The Currently Reading From variable is used to prevent writer module 122 from overwriting the data in logical position 235 while the reader module is reading from logical position 235. When a particular reader module $126_1$–$126_N$ is not currently reading from circular buffer 124, its corresponding Currently Reading From variable is set to infinity.

A "Writer Unblocked Event" variable is used to "wake-up" writer module 122 when it can proceed with its desired write command. For example, the Writer Unblock Event variable is set to an active state when writer module 122 is not blocked, and is reset to an inactive state when writer module 122 is blocked. The Writer Unblock Event can be implemented as a Windows® event (a "Win32" event) or any other similar synchronization mechanism familiar to those skilled in the art.

A "Reader Unblock Event" variable is used for each reader module $126_1$–$126_N$ for "waking-up" the reader module when the data it is requesting is available. For example, the Reader Unblock Event variable is set to an active state when the corresponding reader module $126_1$–$126_N$ is not blocked and is reset to an inactive state when the corresponding reader module $126_1$–$126_N$ is blocked.

A "Critical Section" variable is used to protect access to each of the above shared variables. For example, a "Win32" Critical Section may be used or any other similar synchronization mechanism such as a mutual exclusion "mutex" object, as is known to those skilled in the art.

Figure 9A:
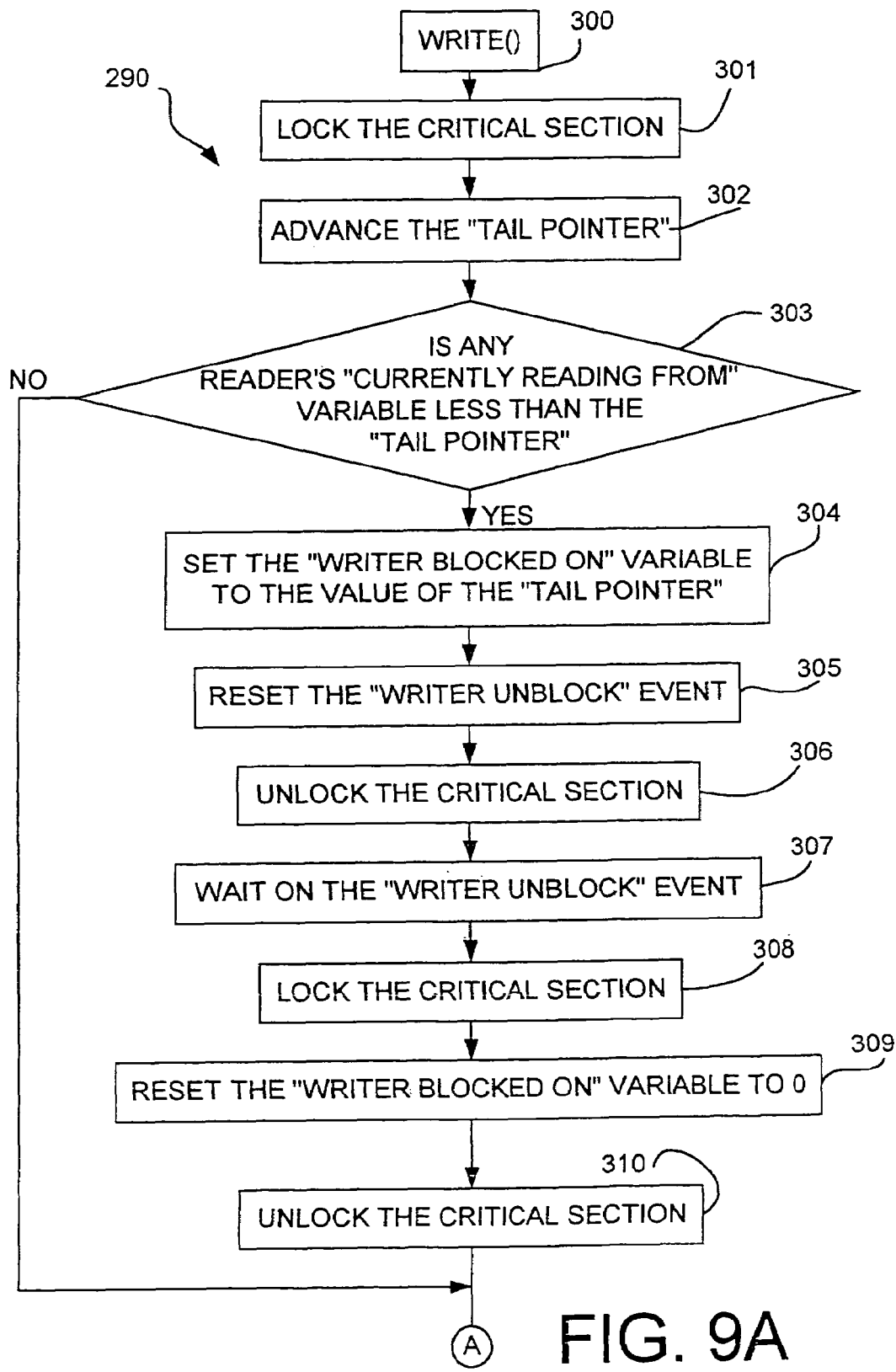
FIGS. 9A and 9B together form a flow chart for a write portion of a synchronization algorithm according to one embodiment of the present invention.

FIGS. 9A, 9B, 11A and 11B together form a flow chart for the synchronization algorithm according to one example of the present invention. The steps performed during a write are shown in FIGS. 9A and are labeled 300–317. At step 300, when the application driving writer module 122 wishes to pass data to Buffer IO layer 200, the application calls algorithm 290. At step 301, algorithm 290 locks the Critical Section to protect access to the variables used in steps 302–305. At step 302, algorithm 290 advances the "Tail Pointer" to the logical position in circular buffer 124 that corresponds to the end of the write command. This logical position will depend upon the amount of data being written by writer module 122. The length of data can vary from one write command or data block to the next, and the data can have arbitrary data formats, which can also vary from one write command or data block to the next.

FIG. 10 is a diagram illustrating advancement of the Tail Pointer in circular buffer 124. Tail Pointer 250 is advanced from logical position 260 to logical position 262. Advancing Tail Pointer 250 immediately invalidates the area to be written (behind the advanced Tail Pointer 250) for future reads, even if writer module 122 must wait before it can actually start writing the data. As a result, once writer module 122 notifies buffer IO layer 200 that it wants to write to an area in circular buffer 124 by calling the writer algorithm, no new reader modules can start reading from that area. This minimizes the time during which writer module 122 must wait for reader modules $126_1$–$126_N$ and prevents the writer from being perpetually blocked.

Referring back to FIG. 9A, synchronization algorithm 290 determines whether any of the "Currently Reading From" variables of readers $126_1$–$126_N$ is less than (i.e. behind) the "Tail Pointer" variable, at step 303. For example, in FIG. 10, a reader module may have a Currently Reading From variable 270 which is pointing to a logical position 272 in circular buffer 124 that is less than the logical position 262 of the advanced Tail Pointer 250. If this is the case, synchronization algorithm 290 blocks or delays writer module 122 so that the conflicting reader module can "get out of the way". If none of the reader modules' "Currently reading From variable is less than the advanced Tail Pointer variable, then synchronization algorithm 290 proceeds directly to step 311 (shown in FIG. 9B) to write the data to circular buffer 124.

At step 304, algorithm 290 sets the "Writer Blocked On" variable to the value of the "Tail Pointer" variable 250. This indicates the largest logical position in circular buffer 124 at which the reader modules $126_1$–$126_N$ must be clear of before writer module 122 can write the data. Algorithm 290 then blocks writer module 122 by resetting the "Writer Unblock" event to the inactive state, at step 305. Since writer module 122 is blocked, the Critical Sections are unlocked at step 306. At step 307, algorithm 290 waits for the "Writer Unblock" event variable to be activated by the synchronization algorithm for the conflicting reader that is accessing the area to be written. When the conflicting reader module activates the "Writer Unblock" event, algorithm 290 locks the Critical Section at step 308 and then resets the "Writer Blocked On" variable to zero, at step 309. Algorithm 290 again unlocks the Critical Section at step 310 and proceeds to step 311 (shown in FIG. 9B).

At step 311, buffer IO layer 200 converts the starting logical address to a circular or physical address and writes the data in circular buffer 124, beginning at that physical address. Once the data has been written, algorithm 290 locks the Critical Section for the variables used in steps 313–315 and advances the "Head Pointer" variable to the logical position in circular buffer 124 that corresponds to the end of the data written by writer module 122. In the example shown in FIG. 10, Head Pointer 274 is advanced from position 276 to position 278 (which can also be viewed as being "behind" the advanced Tail Pointer 250). Advancing Head Pointer 274 validates the newly written data between Head Pointer 274 and Tail Pointer 250.

At step 314, algorithm 290 determines whether any of the "Reader Blocked On" variables for reader modules $126_1$–$126_N$ is less than the advanced "Head Pointer" variable 274. If not, none of the reader modules $126_1$–$126_N$ were waiting for the data written by writer module 122, and algorithm 290 proceeds to step 316. If so, one or more of the reader modules $126_1$–$126_N$ were waiting for writer module 122, which has now validated the desired logical positions. Algorithm 290 sets any such "Reader Unblock" event variables at step 315 to unblock the corresponding reader module.

In the example shown in FIG. 10, a reader module may be waiting to read data at logical position 280 which was not yet available when Head Pointer 274 was pointing to logical position 276. That reader module would have had a "Reader Blocked On" variable pointing to logical position 280, as shown by arrow 282. Now that "Head Pointer" variable 274 is pointing to logical position 278, which is ahead of logical position 280, the data in position 280 is available for reading, and algorithm 290 sets the "Reader Unblock" event variable for that reader module to the active state, thereby unblocking the reader module.

Referring back to FIG. 9B, the corresponding Critical Sections are unlocked at step 316, and the algorithm completes at step 317.

Figure 11A:
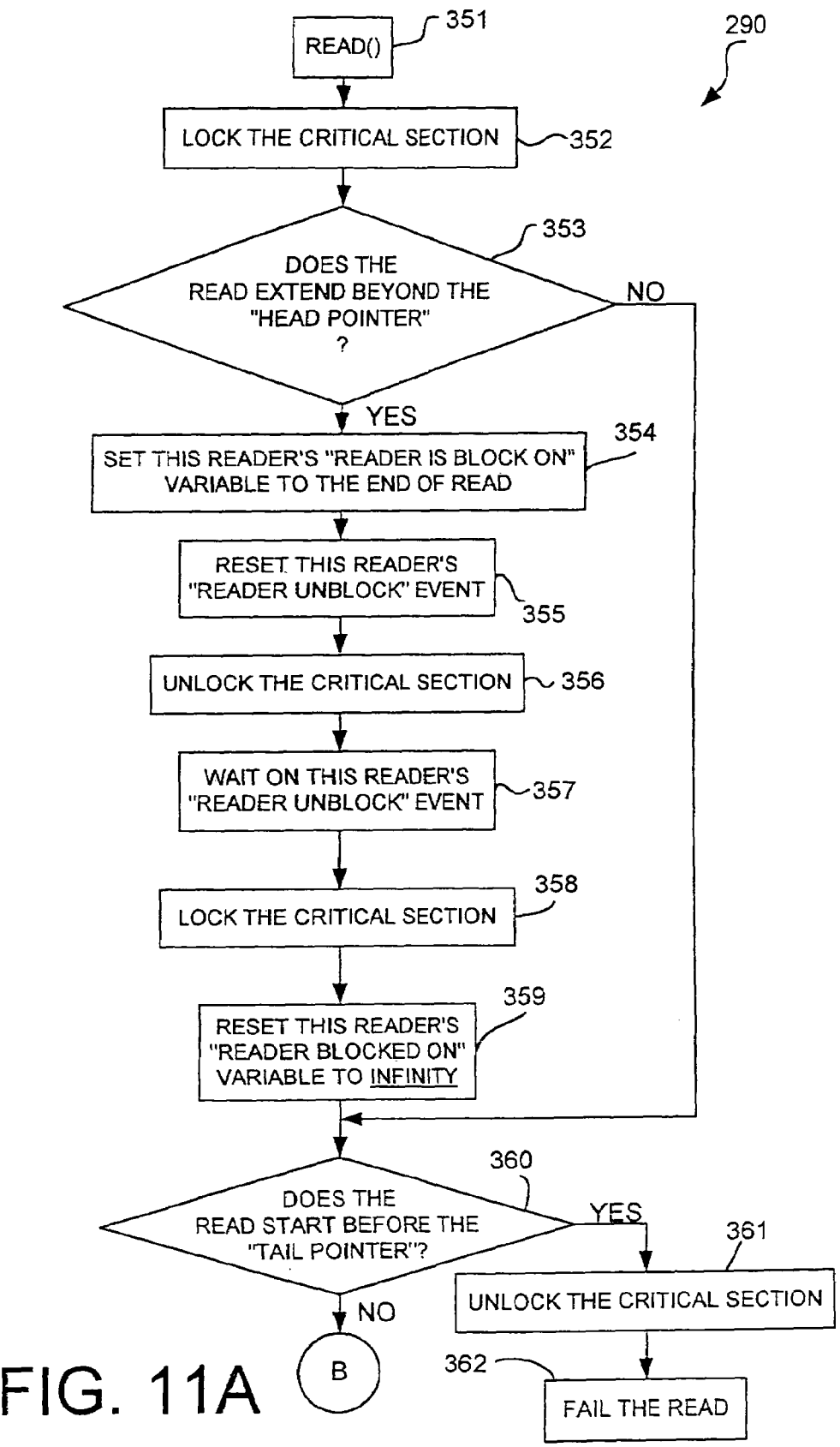
FIGS. 11A and 11B together illustrate a flow chart for a read portion of the synchronization algorithm according to one embodiment of the present invention.
Figure 11B:
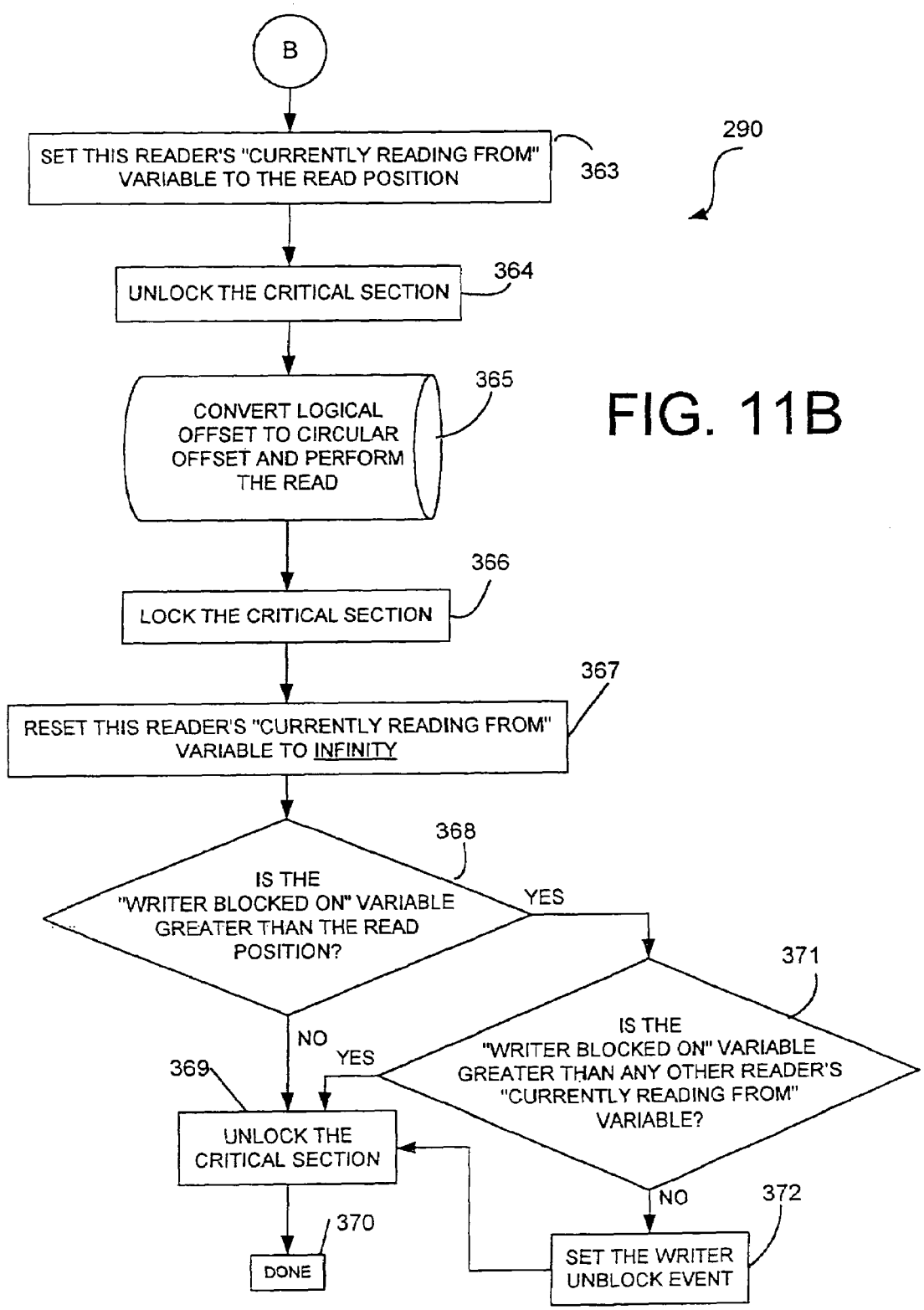

FIGS. 11A and 11B together illustrate a read portion of synchronization algorithm 290, which includes steps 351–372. When one of the reader modules $126_1$–$126_N$ desires to read data from circular buffer 124, that reader module calls algorithm 290 in buffer IO layer 200, at step 351. At step 352, algorithm 290 locks the Critical Section to protect the variables used in steps 353–355. At step 353, algorithm 290 determines whether the amount of data to be read extends to a logical position in circular buffer 124 which is beyond the logical position of the "Head Pointer" such that a portion of the desired data is not yet valid. If not, algorithm 290 proceeds directly to step 360.

FIG. 12 is a diagram illustrating an example of circular buffer 124 when the requested data extends beyond the Head Pointer. Circular buffer 124 has a Tail Pointer 330 at a logical position 332 and a Head Pointer 334 at a logical position 336. If the reader module requests data beginning at logical position 337 and extending up to logical position 338, which is beyond the logical position 336 of Head Pointer 334, then algorithm 350 sets the "Reader Is Blocked On" variable for that reader module to the logical position corresponding to the end of the requested read data (e.g. logical position 338), as shown by arrow 340. Referring back to FIG. 11A, algorithm 350 resets the "Reader Unblock" event variable to block the corresponding reader module at step 355. Since the reader module is blocked, algorithm 350 unlocks the corresponding Critical Section, at step 356. At step 357, algorithm 350 waits for the "Reader Unblock" variable to be set for this reader (at step 315 in FIG. 9B). Once the "Reader Unblock" variable is set, the corresponding reader module is unblocked and the Critical Section is locked at step 358. The "Reader Blocked On" variable for that reader is then reset to infinity, at step 359, and algorithm 350 proceeds to step 360.

At step 360, algorithm 350 determines whether the logical position corresponding to the beginning of the requested data is before the logical position of the "Tail Pointer" variable. If so, the requested data is invalid since it has already been overwritten by writer module 122. In this case, algorithm 350 unlocks the Critical Section at step 361 and fails the requested read operation at step 362. The failure can be passed to the corresponding reader module through a variety of mechanisms, such as a status variable.

If the requested data starts at a logical position that is not before the "Tail Pointer" variable, algorithm 350 proceeds to step 363 (shown in FIG. 11B). At step 363, algorithm 350 sets the "Currently Reading From" variable of the reader to the logical position at the start of the requested data. The Critical Section is unlocked at step 364, and the starting logical address is converted to a circular or physical address for circular buffer 124 (shown in FIG. 7). At step 365, buffer IO layer 200 reads the requested amount of data, beginning at the converted logical address and provides the data to the corresponding reader module, at step 365. At step 366, algorithm 350 locks the Critical Section. At step 367, the "Currently Reading From" variable for the reader is reset to infinity since the read operation has completed.

At step 368, algorithm 350 determines whether the "Writer Blocked On" variable points to a logical position in circular buffer 124 that is greater than the read position. The read position is the logical position in circular buffer 124 corresponding to the beginning of the data to be read. If the "Writer Blocked On" variable is not greater than this logical position, then this reader module was not blocking writing module 122. Algorithm 350 then unlocks the Critical Section at step 369 and completes its function at step 370.

If the "Writer Blocked On" variable is greater than this position, then this reader module was blocking writing module 122, and algorithm 350 proceeds to step 371 to determine whether any other reader module is blocking writer module 122. If not, algorithm 350 sets the "Writer Unblock" event variable to unblock writer module 122, at step 372. If there are other reader modules that are blocking writer module 122, then algorithm 350 proceeds to step 369 without setting the "Writer Unblock" event variable.

Figure 9B:
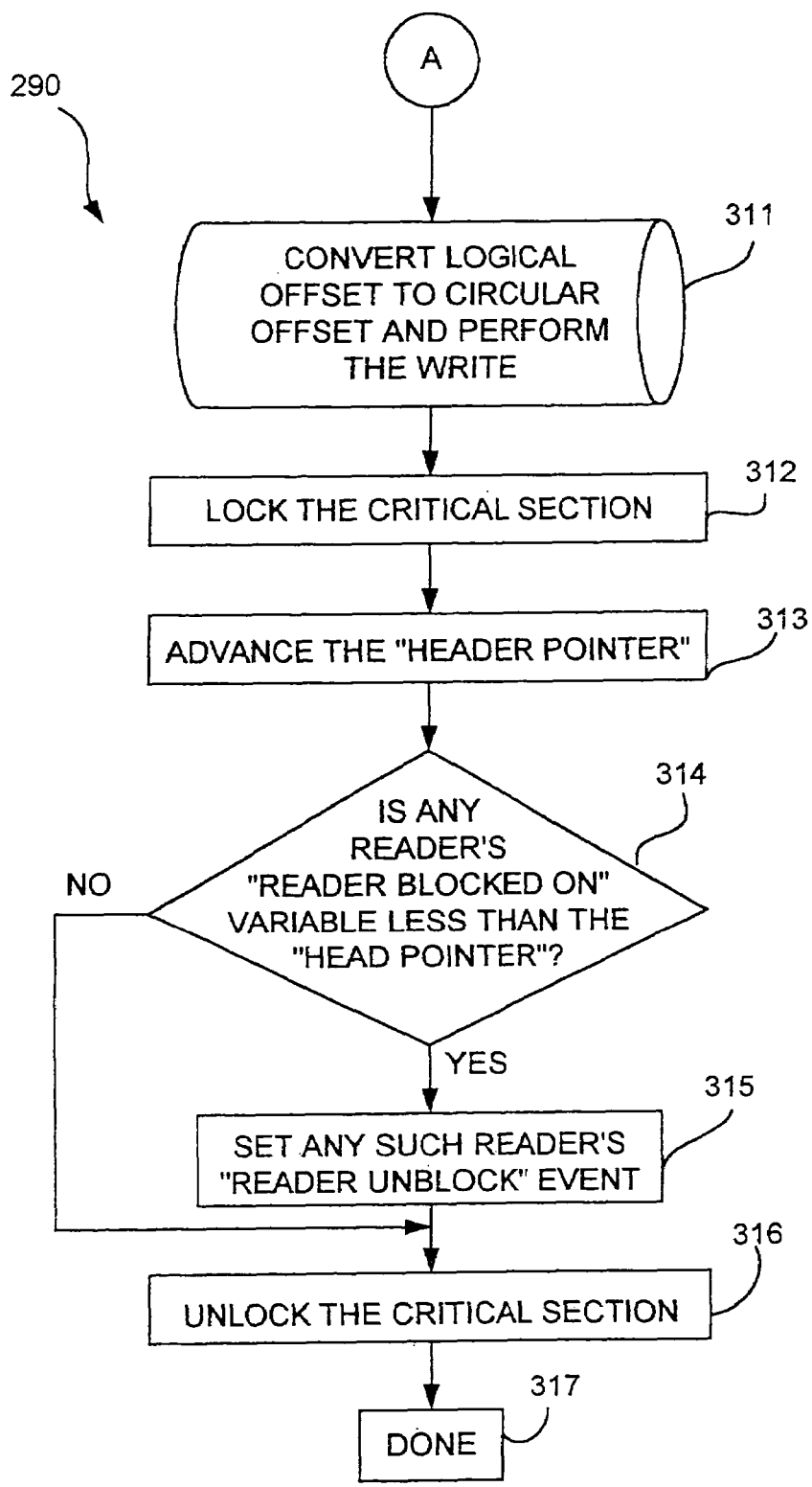

The algorithm shown in FIGS. 9 and 11 can be modified in a variety of ways in alternative embodiments. For example, it may not be desirable to block writer module 122. If the streaming information being provided to writer module 122 may be lost if writer module 122 is delayed by any significant period of time, such as when writer module 122 is coupled to a television tuner, then it would not be desirable to delay writer module 122. In these embodiments, algorithm 290 is modified in FIGS. 9A and 9B to remove steps 303–310 which serve to delay writer module 122. Algorithm 290 proceeds from step 302 directly to step 311. Similarly, algorithm 290 is modified in FIGS. 11A and 11B to remove steps 366–369, 371 and 372 which serve to selectively unblock writer module 122.

In addition, algorithm 290 can be modified to perform steps 360–362 (validating the read operation) either before or after the read is performed at step 365, or both. Validating the read operation before the actual read operation avoids a wasteful read. However, steps 360–362 can be performed after step 366 if desired. Steps 360–362 can also be performed both before and after read step 365.

The synchronization algorithm shown in FIGS. 9 and 11 does not require a circular buffer such as that shown in FIG. 6. The synchronization algorithm can also be used with minor modification in a linear buffer having both logical and physical addresses that wrap around at a frequency based on the size of the buffer. However, a circular buffer allows a reader module to be time-shifted with respect to the writer module such that a portion of the streaming information is available to the user for "instant replay" on demand. A circular buffer allows the user to pause a program, but does not allow the user to inadvertently fill up the buffer with time shifted data. The writer module is always writing to the "beginning" of the buffer, which is point that moves circularly through the buffer.

The synchronization algorithm shown in FIGS. 9 and 11 also allows the user to fast forward through the data stored in the buffer. If the user has paused a reader module so that the writer module is considerably ahead of that reader, the user or the application has the option of fast-forwarding the reader module to catch up to the writer module. However, the synchronization algorithm stops fast-forwarding when the reader module catches up with the writer module. For example, the reader module may initiate a "DirectShow" event (or other appropriate event mechanism available to the software environment) whenever the reader module is blocked by the writer module. The application detects this event, and switches the state of the reader module from fast-forward to normal play mode. If the writer module catches up to the reader module, corruption by the writer module can be avoided by (1) blocking the reader until the data is available, (2) blocking the writer until the reader is out of the way, or (3) moving the reader ahead by unpausing or fast forwarding the reader.

User Operation Permission Checking

Figures 13, 14:
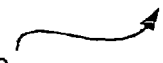
FIG. 13 is a diagram illustrating a status register which is maintained for each data channel for specifying which user operations are permitted or prohibited in a present state of the channel.
FIG. 14 is a table listing examples of user operations corresponding to user operation fields UOP0–UOP10 in FIG. 13.

In one embodiment, delay filter 112 (shown in FIG. 6) further includes a user operation permission checking and reporting mechanism which maintains consistent operating states in the filter. FIG. 13 is a diagram illustrating a status register 420 which is maintained by delay filter 112 for each data stream, or channel, through the filter. Delay filter 112 can maintain register 420 in RAM, for example, or any other storage medium. Status register 420 includes a plurality of fields, with each field having one or more bits. In the example shown in FIG. 13, bits 0–10 of status register 420 correspond to user operation fields UOP1–UOP10, respectively. Bits 11–27 correspond to reserved fields. Bits 28–31 correspond to a channel streamer ID field which identifies the particular data stream through writer module 122 and reader modules $126_1$–$126_N$ to which status register 420 is associated. Each user operation field UOP0–UOP10 has a binary value which indicates whether the corresponding user operation is permitted or prohibited. For example, a binary "one" in the corresponding field would indicate that that user operation is permitted. A binary "zero" in a user operation field would indicate that that user operation is prohibited. FIG. 14 is a table listing examples of user operations that correspond to user operation fields UOP0–UOP10. Delay filter 112 maintains the UOP fields for each stream or channel based on the state of its reader module. Delay filter 112 updates the user operation bits whenever the state of the reader module changes.

Certain user operations might be permitted only in certain states of the delay filter. Use of a prohibited operation might lead to inconsistent states in the delay filter and user interface. For example, assume that a reader module that is performing "time-shifting" of multimedia content is paused at point X in the circular buffer 124. In the meantime, writer module 122 is still writing data into circular buffer 124. Depending on the size of the circular buffer 124 and the time for which the reader module has been paused, there is a possibility that writer module 122 can catch up to the point X where the reader module is paused and try to overwrite the data. In this case, delay filter 112 can forcibly "unpause" the reader module and send a notification to the application that the paused reader module has been unpaused. There is a small time window between the time at which the reader is "unpaused" and the time at which the application receives the notification. During this time window, the application might issue a prohibited user command, such as a forward scan. The reader module will now be performing the forward scan at the time the application receives the notification that the reader module has been unpaused and is playing at normal speed. The application and the delay filter 112 are therefore in inconsistent states.

To avoid this problem, delay filter 112 allows the application to check the user operation bits whenever a user operation is issued to check for validity of the operation. Also, whenever the user operation bits change, delay filter 112 reports this change to the application. The application can therefore update its user interface to ensure that invalid user operations are not issued to the delay filter 112.

Figure 15:
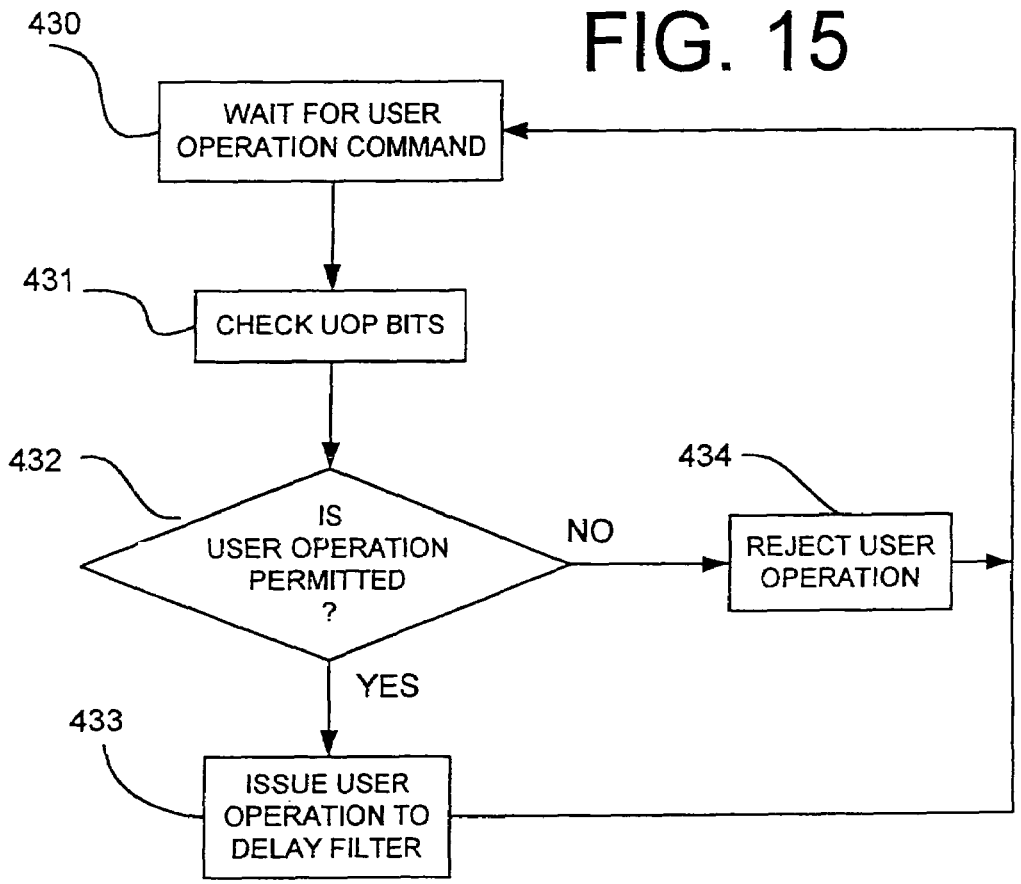
FIG. 15 is a flow chart of a software object that is called by an application in response to a user operation request.

FIG. 15 is a flow chart of a software module or object that can be called by the application through an application program interface ("API"), for example, whenever the user requests an operation or the user operation status bits change. At step 430, the application waits for the user to request an operation. Once a user operation has been requested, the application checks the status of the corresponding user operation bit, at step 431. If the operation is permitted at step 432, the application issues the requested operation to delay filter 112, at step 433. If the requested operation is prohibited, the operation is rejected at step 434.

Figure 16:
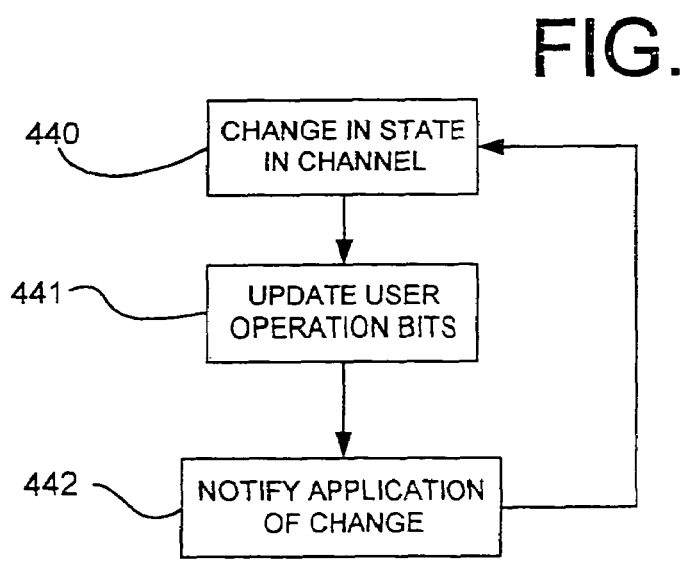
FIG. 16 is a flow chart illustrating steps performed by the delay filter in maintaining the user operation bits of the status register shown in FIG. 13.

FIG. 16 is a flow chart illustrating steps performed by delay filter 112 in maintaining the user operation bits for each status register. At step 440, delay filter detects a change in the state of one of the reader modules. At step 441, the user operation bits of the status register for the corresponding stream or channel are updated as a function of the change in state. Delay filter 112 then notifies the application through an API, for example, for that stream or channel of the change in state, at step 442. The application can then update the user interface to disable or enable selected subsets of the user operations listed in FIG. 14. A user interface update can include setting or resetting light indicators, issuance of an audible alert or changing screen displays, for example. The application can determine whether the user interface should be updated by querying the delay filter 112 for the user operation bits for a specific stream or channel.

Time Shifting

Another broad inventive aspect illustrated by the exemplary embodiment includes the concept of "time shifting" when streaming information is rendered. Generally, an information appliance for receiving streaming information implements time shifting by including a buffer (in a one embodiment circular buffer 124), writer module 122 which receives blocks of streaming information and writes blocks to the buffer, and at least one reader module 126 which selectively reads the blocks from the buffer.

Although all signal processing equipment inherently includes signal propagation delay, "time shifting," as used herein, is distinguishable for the reasons discussed below separately or in any combination. In the first instance, the amount of time shifting (i.e., the relative position of any one reader module 126 with respect to the writer module 122 in circular buffer 124) is selective and adjustable. In a first mode of operation, the user can "rewind", "pause", "fast forward" and "play" in any desired order, thereby changing the relative reading position of an associated reader module 126 with respect to a position of writer module 122 in circular buffer 124. Hence, rendered streaming information (which begins with a reader module 126) is delayed in time from the streaming information that is written by writer module 122.

In another mode of operation, logic is provided to adjust the amount of "time shifting" based upon operation of the system and without user intervention. For instance, if a reader module has been "paused" by a user, thus maintaining the current position of reader module 126 in circular buffer 124, at some time it may be necessary to begin advancing the reader position in order that writer module 122 can store new streaming information in circular buffer 124. This situation may require reader module 126 to begin moving forward within circular buffer 124 at a rate greater than or at least equal to the rate at which streaming information is being written to circular buffer 124.

Automatic adjustment of the position of a reader module 126 in circular buffer 124 can also be initiated by user commands not directly associated with movement of a position of reader module 122, such as "play", "pause", "rewind" and "fast forward". As probably best illustrated by example, the source of streaming information 114 to delay filter 112 can be a multiple broadcast channel device such as a television tuner, or the like. If the user begins rendering information pursuant to a selected broadcast channel, pauses, and then again resumes rendering information on the same broadcast channel, the associated position of reader module 126 will change position accordingly, thereby increasing the relative distance of the position of reader module 126 and the position of writer module 122 in circular buffer 124. If the user then selects a different broadcast channel to be rendered, for example, a different television channel, writer module 122 will then record the streaming information associated with the new broadcast channel in circular buffer 124. However, since the position of reader module 126 is "time shifted" from the position of writer module 122 by a delay in proportion to the amount of time the user had paused, the user will not notice the new broadcast channel selection until reader module 126 reaches the new streaming information in circular buffer 124 provided by the change in broadcast channel. In order to obviate the problems presented by the foregoing, the position of reader module 126 is automatically advanced to a position in circular buffer 124 adjacent the position of writer module 122. This technique reduces the amount of delay so that rendered streaming information substantially follows broadcast channel selection in a multiple broadcast channel environment.

Another distinguishing feature between "time shifting" as used herein and typical signal propagation delay is the medium used to record streaming information. In particular, as discussed above, circular buffer 124 can be embodied using any of the storage devices described above such as RAM memory, hard disk 27, or the like. In addition, the amount of memory present in circular buffer 124 is sufficient to provide a perceptible delay to the user, if desired. In one embodiment, the extent of circular buffer 124 provides at least five minutes of delay between writing and rendering of streaming information. In a further embodiment, the extent of circular buffer 124 is sufficient to provide at least 30 minutes of delay between writing and rendering streaming information. In yet a further embodiment, the extent of circular buffer 124 is sufficient to provide at least one hour of delay.

A further distinguishing feature of "time shifting" as used herein includes the presence of a single writer module 122 and a plurality of independent reader modules $126_1$–$126_N$.

In one embodiment, any information received from streaming source 114 is first recorded in circular buffer 124 prior to rendering the streaming information to the user. In other words, all information to be rendered to the user is read with an associated reader module 126 from circular buffer 124, wherein there exists no direct connection from streaming source 114 to rendering devices 116. Although recording and reading from circular buffer 124 prior to rendering streaming information, may slightly increase propagation delay when the position of reader module 126 in circular buffer 124 is substantially adjacent to the position of writer module 122, advantages of always writing to and reading from circular buffer 124 include simplification in system design and operation, which enhances system stability. Although a switching mechanism could be provided in the system to switch from substantially "live" streaming information and time shifted streaming information as provided by delay filter 112, the switching mechanism whether software, hardware or a combination thereof, nevertheless necessitates another component in this system that must be designed and tested to operate with the remaining components of the system. Furthermore, by eliminating a direct connection of the source of streaming information 114 and the rendering devices 116 and always reading from circular buffer 124 prior to rendering, the quality of rendered information is consistent. In other words, there is no change in quality (e.g., video quality or audio quality) of rendered streaming information since all information must pass through the same system components. Furthermore, by always writing to and reading from circular buffer 124, the user need not remember to execute a particular command so that streaming information is recorded, for example, in order to provide "instant replay." In this manner, the user is also able to retrieve and save an entire segment of streaming information (such as a television show) even when the user has already rendered some of the streaming information. Thus, if the user is viewing a show and then later decides to save the show, he can invoke archive system 136 to begin at the start of the show in circular buffer 124 and transfer a copy of the streaming information to a more permanent file. The latter can be performed while still viewing the show with a separate reader module 126. However, the user must initiate saving or archiving prior to writer module 122 writing over any of the desired streaming information, but in a preferred embodiment, circular buffer 124 is of sufficient length to provide many minutes if not hours of stored information.

Data Block Structure

FIG. 17 is a pictorial representation of a block 500 of data stored in circular buffer 124 for one stream of a multi-stream source of streaming information. Generally, data block 500 includes a header portion 502, a data or payload portion 504 and a tail or end portion 506. Header portion 502 contains relevant information as to the size of the data block and the channel to which it pertains. In particular, header portion 502 includes a field 508 in which the size of the entire block, including this field, is stored. Field 509 contains information used to identify the streaming information to which the data block pertains. Field 510 provides a distance (typically bytes) from the beginning of the data block to where the actual streaming information or payload is stored in data block 500. Field 511 provides a value indicating the size of the actual data or payload 504. In one embodiment, each of fields 508–511 are of fixed length in order that their location in data block 500 is known.

In one embodiment, a field 512 is also provided in header portion 502. Field 512 provides other information relevant to the streaming information. As used herein, field 512 is referred to as "prefix field" in view of its relation to the actual data or payload 502. In a one embodiment, prefix field 512 is of variable length, thus the information need not be length restricted. If desired, a field 513 is also provided, indicating the size of the prefix field 512. Typically, field 513 is also of fixed length, like fields 508–511.

Prefix field 512 can be used to store information such as synchronization indicators, discussed below, a pointer to the next data block pertaining to the same stream, or other information as may be desired. As appreciate by those skilled in the art, a format is specified for information to be contained in prefix field 512 in order that relevant information can be decoded easily. However, since prefix field 512 can be of any length, additional information can be stored as necessary, thereby making data block 500 extensible.

It should also be noted that prefix field 512 can also include a selected amount of "fill" data. The fill data is used to adjust or increase the size of data block 500 to a predetermined length, which may be desirable for processing or storage in circular buffer 124.

Data or payload field 504 stores digital data received from the source of streaming information 114, which will be rendered.

In the embodiment illustrated, tail or end portion 506 includes two fields 520 and 521. Field 520, herein also referred to as "suffix field" is similar to prefix field 512 in that it can be used to store information about data blocks that are successive or preceding in the same stream. In one embodiment, suffix field 520 is at a known location from the end of data block 500 and stores a pointer indicating the location of the preceding data block corresponding to the same channel. This information is particularly useful when it may be necessary to perform a "rewind" operation upon the streaming information contained in circular buffer 124.

Suffix field 520 can also include other information present in the data block 500 such as data associated with field 511 and field 513. In a manner similar to prefix field 512, a format for the information contained in suffix field 520 is predetermined and known to the reader module in order that relevant information can be obtained therefrom. Suffix field 520 can be of fixed length, or can be of variable length, wherein it may be desired to provide an additional field similar to field 513 that indicates the length of suffix field 520. Suffix field 520 can also be used to store "fill data", if desired.

Field 521 provides the size of data block 500 and, as such, is identical to field 508 in header portion 502. Field 521 is useful when a reader module progresses backward through the circular buffer 124. In this manner, the reader module can ascertain the size of a data block 500 by reading the value contained in field 521, at which point, the reader module has determined where the end of the preceding block is located. Without the presence of field 521, the reader module would otherwise have to scan the data block 500 in order to determine its size or beginning location, which can consume processing time.

FIG. 18 illustrates a sequence of data blocks 530 from a multi-stream streaming information source. In particular, data blocks 532A, 532B and 532A comprise a portion of a first stream; data blocks 534A and 534B comprise a portion of a second stream; and data blocks 536A and 536B comprise a portion of a third stream. The data blocks 532A–532C, 534A–534B and 536A–536B together comprise a single channel and (e.g., audio, video and data) are generally interposed such as illustrated in FIG. 18; however, there is generally no requirement that a specific order be followed.

As indicated above, prefix fields 512 and suffix fields 520 can be used to store pointers indicating preceding and succeeding data blocks in each of the stream streams. In the illustration of FIG. 18, arrows 534 represent that prefix fields 512 of data blocks 530 store pointers or addresses of the immediate succeeding data block in each of the stream, respectively. Similarly, arrows 536 represent that suffix fields 320 of each of data blocks stores pointers or addresses of the immediate preceding data block in each stream, respectively. In one embodiment, each of the prefix fields 512 stores the address of the prefix field 512 in the immediate succeeding data block, while each of the suffix fields 520 stores the address of the suffix field 520 in the immediate preceding data block. In this manner, reader module 126 can quickly locate and process data blocks for a particular stream of streaming information.

FIG. 19 illustrates a second sequence of data blocks 550. In sequence 550, data blocks 552, 554 and 556 pertain to streaming information received from streaming information source 114, which will be selectively rendered by rendering devices 116 in the manner discussed above and further below. However, sequence 550 further includes data blocks 558 and 560 that "pad" the sequence 550 and do not contain any streaming information to be rendered. Rather, data blocks 558 and 560 are used, if desired, to organize or structure the sequence 550 stored in circular buffer 124, or other storage device, in a desired manner. For instance, it may be desirable that data blocks stored in circular buffer 124 coincide with defined medium boundaries partition such as sector or cluster boundaries. In FIG. 19, desired boundaries are indicated at 562A and 562B. Data blocks 552, 554 and 554 are organized along with a padding data block 560 of suitable size or length such that a data block 564 begins at the boundary 562B. If desired, a plurality of padding data blocks can be used, and the order of streaming information data blocks and padding data blocks can be changed to meet any desired criteria. The sequence of FIG. 19 is but one exemplary sequence structure.

It should be noted that field 509 of each data block can be used to identify padding data blocks from other streaming information data blocks wherein writer module 122 can generate padding data blocks as necessary during processing and formation of streaming information data blocks. Furthermore, padding data blocks can be used in combination with "fill" data provided in prefix field 512 or suffix field 520, if desired. Mux formatter 138 and writer module 140 can also implement the use of padding data blocks, and/or fill data contained in prefix field 512 or suffix field 520.

Multiple Readers Per Buffer

It may be desirable, in some instances, to allow a plurality of users to access the streaming information at any one time. This can be accomplished in any number of different ways. For example, the streaming information could be duplicated and one reader module can be provided for each copy of the streaming information. However, this requires a great deal of storage, and may also require increased processing power for making multiple copies of the streaming information and for accessing the duplicate copies. Also, once the predetermined number of copies of the streaming information are in use, it can become very difficult to add new users.

Figure 20:
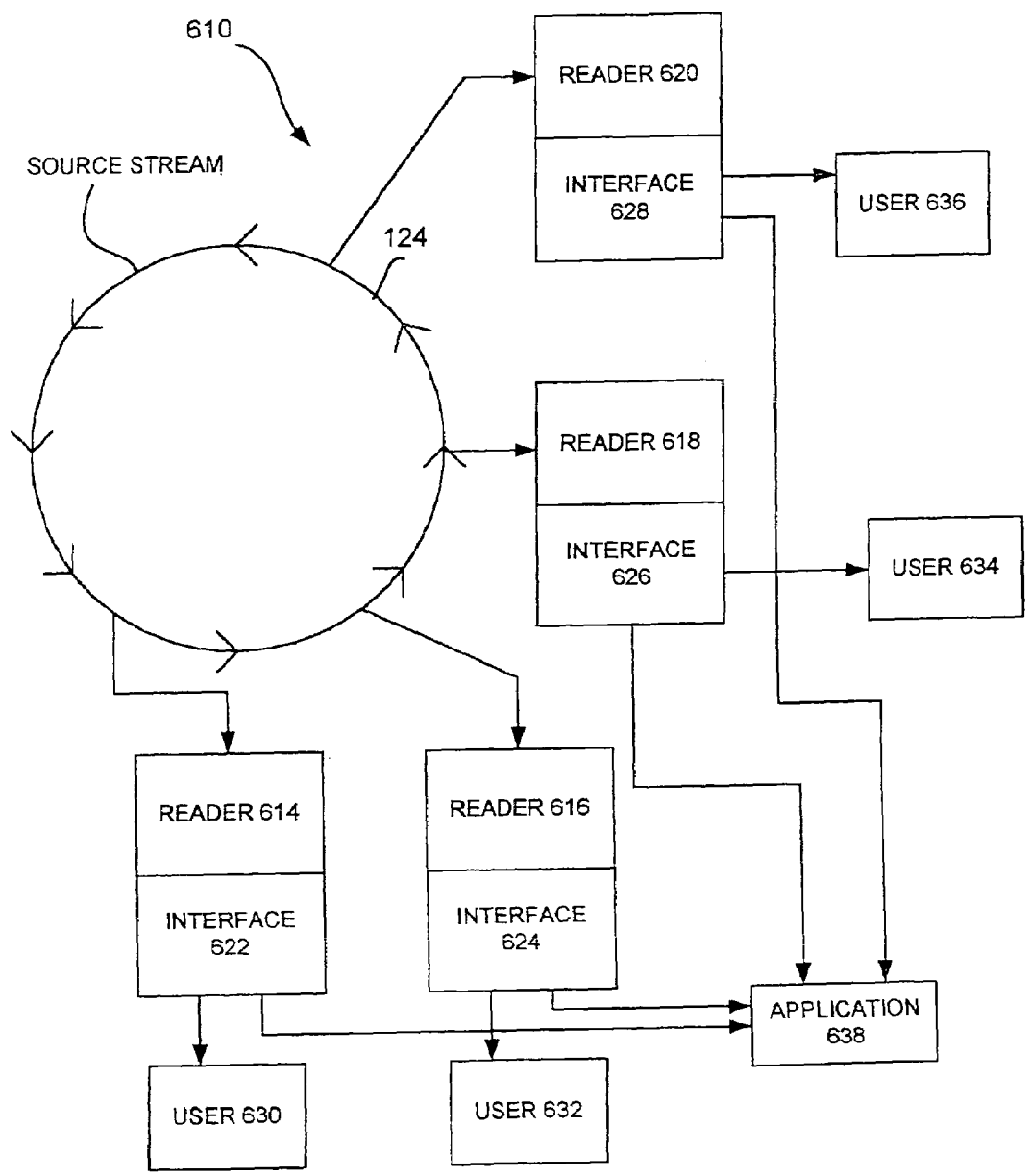
FIG. 20 is a block diagram of another embodiment of a system in accordance with the present invention.

FIG. 20 is similar to FIG. 6 described above. However, FIG. 20 illustrates portions of a system 610 in more detail and eliminates other portions for clarity. For example, FIG. 20 illustrates that system 610 includes circular buffer 124, a plurality of reader modules 614, 616, 618 and 620 (which can be the same as or similar to reader modules 126 mentioned above) associated with a plurality of users (users 630–636, respectively). Similarly, FIG. 20 illustrates that each reader module includes an interface 622, 624, 626 and 628, respectively. Interfaces 622–628 are described in greater detail below.

In the illustrative embodiment shown in FIG. 20, a plurality of users 630, 632, 634 and 636 are depicted coupled to interfaces 622–628, respectively. In the embodiment illustrated, users 630 and 632 are viewers, or rendering applications, for viewing or rendering streaming information stored in circular buffer 124, while users 634 and 636 are data storage sites which are used for archiving the streaming information stored in circular buffer 124. FIG. 20 also illustrates a separate application program 638, separately coupled to interfaces 622–628.

Again, it should be noted that FIG. 20 is illustrative only, and that any number of users or application programs can be coupled to any number of reader modules. Similarly, the users can be any suitable type of users desirous of accessing the streaming information stored in circular buffer 124, and may be accessing the information for reasons other than viewing, or archival purposes, as is depicted in FIG. 20. Similarly, in accordance with this aspect of the present invention, the buffered streaming information need not necessarily be stored in circular buffer 124, but can be stored in a linear buffer, or any other type of buffer. However, circular buffer 124 is illustrated for purposes of simplicity only.

In one illustrative embodiment, reader modules 614–620 are implemented as objects which conform to the COM object-oriented programming model. Each reader module or "reader object" has independent access to the buffered streaming information. Each reader module 614–620 is depicted as accessing the streaming information at a different location on circular buffer 124. This illustrates that reader modules 614–620 can access the buffered information at different times in the buffered information stream. This allows the multiple users 630–636 to independently employ all the features of time shifting mentioned above, without interfering with the other users accessing the buffered information stream. One user, for instance, can archive the streaming information for later viewing, while at the same time another user can view the information.

Similarly, the archival user can store the buffered streaming information from a time or location in the data buffer which is different than the time or location in the data buffer which the viewer is accessing. For instance, the archival user may simply be reading the information, as it is recorded in circular buffer 124, and storing it in archival storage. By contrast, the viewer may be viewing the data, but intermittently pausing to take breaks or perform other tasks. Therefore, the reader module associated with the viewer may well be at a temporally displaced location in buffer 124 than the reader module associated with the archival process.

Thus, FIG. 20 illustrates a system by which multiple reader modules can access the buffered streaming information. The system depicted requires only one writer module for buffering the streaming information, and only a single copy of the streaming information. This greatly reduces the amount of storage required, and also reduces the processing power required. Similarly, since the reader modules, in one illustrative implementation, are simply objects configured to access the information in buffer 124, virtually any number of objects can be added to the system, limited only by the computational resources of the system. This can be accomplished by simply instantiating another reader object.

Since the streaming information written in circular buffer 124 can be formed of one or more channels each having a plurality of streams (e.g., audio, video, closed captioning, etc.), the output from each of the reader modules 614–620 will likely have a plurality of effective output pins, each pin carrying one of the streams of a given channel in the streaming information. Since system 610 illustrates that a plurality of different reader modules can be used to access the same buffered streaming information, this can present some obstacles which must be overcome.

For example, in some streaming architectures, the need may arise to group the pins associated with each reader module 614–620 so that the user, application, or whatever other component is receiving the data from the reader module, knows which pins are associated with that reader module. An example of a streaming architecture which can be used in accordance with the present invention is an architecture known as DirectShow services.

DirectShow services is an architecture which is commercially available and well known. However, for a better understanding of certain aspects of the present invention, a brief description of the DirectShow services system may be beneficial.

DirectShow services refers to a modular system of pluggable components known as filters, arranged in a configuration known as a filter graph. A component referred to as a filter graph manager oversees the connection of these filters and controls the flow of the streaming information therethrough. An exemplary filter graph is composed of a collection of filters of different types.

Most filters can be categorized into one of three types:
1. Source filters take data from a source, such as a disk file, camcorders, satellite feed, internet server, or VCR, and introduce that data into the filter graph;
2. Transform filters process data and pass it along to other portions of the filter graph, or out of the filter graph; and 3. Rendering filters render data to a hardware device or to any location that accepts media input (such as memory or a disk file).

In addition to these three types of filters, there are other kinds of filters also. Examples of other filters include effect filters, which add effects without changing the data type, and parser filters, which are configured to understand the format of the source data and know how to read correct bytes, create time stamps, and perform seek operations.

Further, it is quite possible for some filters to represent a combination of filter types, or functions. In the DirectShow architecture, a filter is said to pass streaming information "downstream" to a next subsequent filter. An "upstream filter" refers to the filter which passes data to the downstream filter, and a "downstream filter" refers to the next filter in line to receive the data. In one illustrative embodiment, the filters are program modules written in any language which can generate objects adhering to component object model (COM) programming. Of course, COM programming refers to the object-oriented programming model which defines how objects interact with a single application or between applications. In COM, client software accesses an object through a pointer to an interface (e.g. API) which has a related set of functions, called methods, on the object.

Figure 20A:
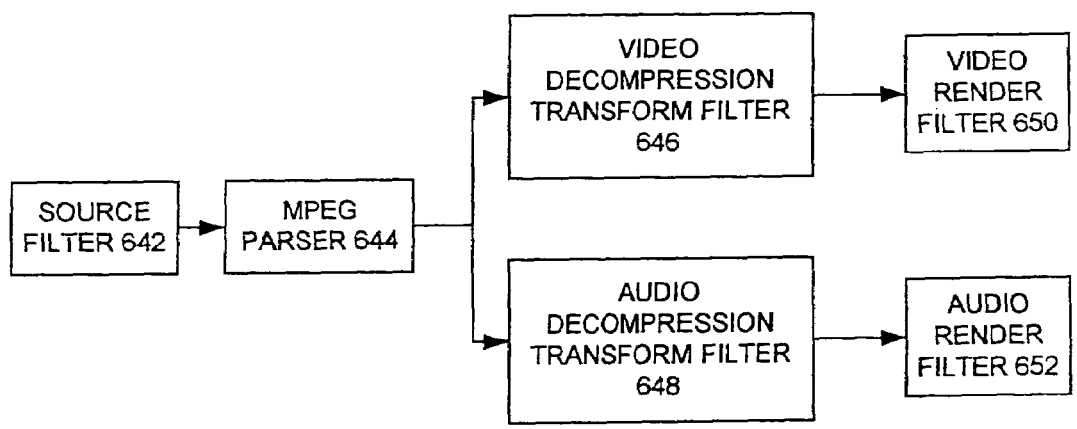
FIG. 20A is a block diagram of an example of a filter graph.

By way of example only, a filter graph 640, the purpose of which is to play back MPEG-compressed video information from a file may take the form set out in FIG. 20A. Filter graph 640 includes source filter 642, MPEG parser 644, video decompression transform filter 646, audio decompression transform filter 648, video render filter 650 and audio render filter 652. Source filter 642 reads data from a disk and provides it as streaming information to MPEG parser 644. MPEG parser 644 parses the streaming information into its audio and video streams. Transform filters 646 and 648 decompress the video and audio data in the corresponding streams. Render filters 650 and 652 act to display the video data on a screen and send the audio information to a sound card, respectively.

It can thus be seen that, when using certain streaming architectures, such as the DirectShow architecture, it can be important that applications or other programming modules which are to receive streaming information from any of reader modules 614–620 know which output pins correspond to which of the reader modules. For example, since the streaming information being read by each of the reader modules 614–620 can include a channel having a plurality of streams, it is important that a user or application program receiving information from any given reader receive all streams associated with that reader, and no other reader. In other words, it would be undesirable for an application program (or a rendering filter, for example) to receive an audio stream from reader module 614 but a video stream and closed caption stream from reader module 616. Reader module 616 may well be reading the stream information from a different location in buffer 124 than reader module 614. Therefore, the audio and closed captioning streams would not correspond to the video stream.

In order to address this obstacle, one feature of the present invention includes a new COM interface which allows an object outside of reader modules 614–620 to enumerate the output pins which belong to that particular reader module. In other words, in the embodiment in which reader modules 614–620 are implemented as objects, those objects are configured to expose methods through associated interfaces 622–628 to the application (or other external components which have contact with the reader modules) which allow manipulation of the object. One exemplary method exposed by interfaces 622–628 is referred to as IenumChannelStreamPin, which, when invoked by an outside object, yields a value which represents an enumeration of the particular output pins belonging to the particular reader module which was queried. In this way, an outside object can quickly and easily obtain an enumeration of the particular pins belonging to any of the given reader modules 614–620, through its associated interface 622–628.

Interfaces 622–628 also expose another method which allows any specific pin output by any of reader modules 614–620 to be queried for its group's enumerator object. In other words, an outside object can query any pin with which it has contact to obtain the identity of the particular enumerator corresponding to the group which includes that pin. In this way, a user or application program which has only recently gained access to an output pin, can query that output pin to find the enumerator associated with that output pin. The external component can then invoke the method exposed by the enumerator to obtain a complete enumeration of the pins corresponding to that channel. The external component can thus quickly and accurately obtain the identity of the pins associated with any given reader module, or channel, being output by system 610.

Indexing and Seeking

As discussed above, indexer 132 generates an index which contains index entries that are used for seeking. In other words, each of reader modules 614–620 can seek to any point in buffer 124 which has a corresponding entry in the index. In some instances, depending on the nature of the streaming information, substantially any point in buffer 124 can be indexed. However, for other types of streaming information, it may be desirable to index only certain points within the streaming information. Such points are referred to herein as sync points. In other words, the nature of the streaming information may render it unreasonable or undesirable to seek to certain points within the streaming information and begin rendering the data at that point.

For example, some video streaming information works on the well-known MPEG2 video format. Such a format includes a number of different types of frames which are referred to as I frames, B frames, and P frames. I frames need no other information in order to be rendered, while B and P frames are dependent frames which require information in a preceding I frame in order to be rendered. In such an example, it may be undesirable to seek to a point within buffer 124 which begins with a B or P frame. In fact, many conventional video decoders may not even be able to decode data which is provided from a B or P frame, without the necessary information contained in the preceding I frame. Therefore, it may be highly desirable to index only I frames in such a video stream stored on buffer 124.

Similarly, where the streaming information contains a stream, such as written text for closed captioning, it may be desirable to allow a user to seek to points which correspond to the beginning or ending of words, the beginning or ending of sentences, or the beginning or ending of paragraphs. The same is true for an audio stream. In other words, it may be desirable to allow a user to only seek to certain spots in the audio stream. Such spots may correspond to sentence or word boundaries, etc.

Therefore, one illustrative feature of the present invention includes a stream analyzer 654, such as that illustrated in FIG. 21A. Stream analyzer 654 is shown coupled to a source 656 of streaming information and a sink 658 of streaming information. Stream analyzer 654 is configured to receive the streaming information from source 656 (which can be implemented as a software object).

In one illustrative embodiment, stream analyzer 654 embodies knowledge of the organization of the streaming information provided by source 656. Analyzer 654 also illustratively embodies knowledge regarding the detection of logical boundaries in the information in order to obtain the location of those boundaries (sync points). The location of the sync points can then be presented to any other software or hardware component which may desire the information in order to enable skipping forward or backward through the streaming information more practicable.

Stream analyzer 654 illustratively provides an indication of the sync points in one of two ways. In a first embodiment, stream analyzer 654 embeds the location of the sync points within the streaming information itself, as it is provided to information sink 658. This is referred to as in-band communication of derived sync point information.

In an alternative embodiment, stream analyzer 654 can provide the sync point information as indicated by dashed arrow 660, separately from the streaming information provided to sink 658. This is referred to as out-of-band communication of the derived sync point information.

In one illustrative embodiment, stream analyzer 654 is implemented in the C++ programming language using classes and communicating with other software objects using COM interfaces. However, it should be noted that such an implementation is illustrative only and the present invention is not limited to this particular method of implementation.

The information sink 658 can, of course, be a downstream filter (downstream of stream analyzer 654) an application program, a rendering filter or other program component, etc. Sink 658 can use the derived sync point information itself, or simply pass it on to other components which may wish to use the derived sync point information. In one illustrative embodiment, the derived sync point information is provided to delay filter 112 which uses it in generating an index, as is described in greater detail below.

In another illustrative embodiment, not only does stream analyzer 654 analyze the incoming streaming information for logical boundaries which can be used as sync points, but stream analyzer 654 also analyzes the incoming streaming information for points of interest which may be desirable sync points. Such points of interest can be substantially any points which are deemed to possibly be of interest to the user. Therefore, in such an embodiment, stream analyzer 654 embodies knowledge of the type and format of information in the incoming stream, as well as knowledge of the types of events of interest to the user. Similarly, stream analyzer 654 is configured to contain knowledge of how to detect these points of interest in the incoming streaming information, and is provided with a mechanism to report the location in the data stream which corresponds to these points of interest.

FIGS. 21B and 21C are more detailed block diagrams illustrating stream analyzer 654 in accordance with illustrative embodiments of the present invention. FIG. 21B illustrates an embodiment of stream analyzer 654 in which the derived sync point information is provided out-of-band, while FIG. 21O illustrates an embodiment in which the derived sync-point information is provided in-band.

In FIG. 21B, stream analyzer 654 includes point of interest (POI) analysis component 662, point of interest interface component 664 and streaming information interface component 666. The streaming information is provided from source 656 to point of interest analysis component 662 which calls on its base of knowledge regarding the type of information and the organization of information contained in the streaming information, as well as its knowledge regarding points of interest to the user. POI analysis component 662 then identifies points of interest in the streaming information and provides an output 668 which is indicative of the location of the points of interest (i.e., it is indicative of the sync points). Output 668 is provided to POI interface 664 which makes the information available to sink 658. Similarly, POI analysis component 662 passes the incoming streaming information on to streaming information interface 666 such that the streaming information is separately available to sink 658.

FIG. 21C is similar to FIG. 21B and similar items are correspondingly numbered. However, rather than having two separate interfaces 664 and 666 for the sync point information and for the streaming information, stream analyzer 654 illustrated in FIG. 21C has a single combined interface 669 which integrates the point of interest (or sync point) information into the streaming information and provides it as an in-band output to sink 658. It should, of course, be noted that the integration of the sync point information can also be accomplished in POI analysis component 662. In any case, a single output of streaming information (which contains the sync point information in-band) is provided to sink 658.

Figure 21D:
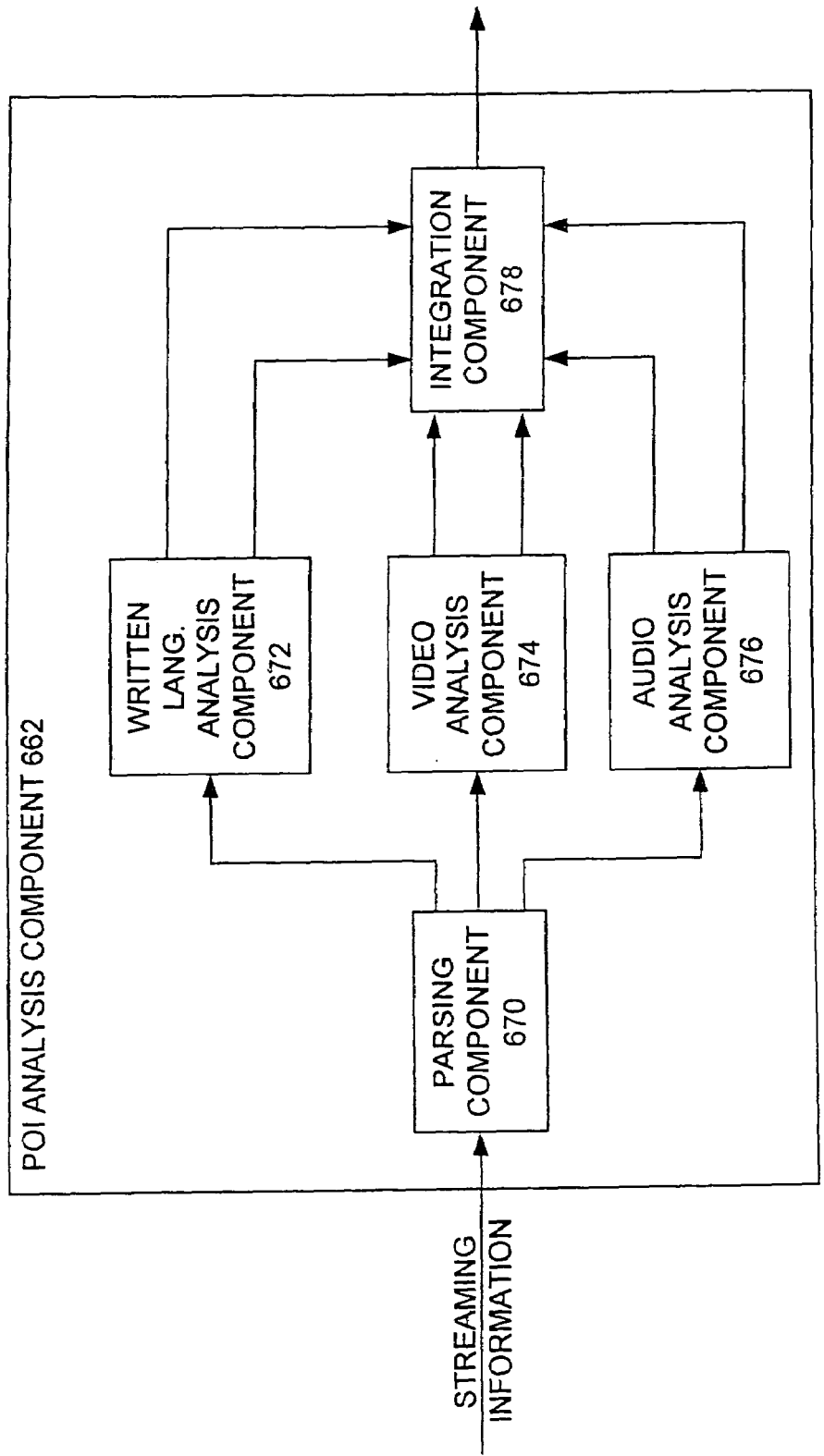

FIG. 21D is a more detailed block diagram of one embodiment of point of interest analysis component 662, in which in the integration of the sync point information into the streaming information provided at its output, is performed within point of interest analysis component 62. POI component 662 includes, in the illustrative embodiment shown in FIG. 21D, parsing component 670, written language analysis component 672, video analysis component 674 and audio analysis component 676. While any type of information analysis components can be used, components 672, 674 and 676 are illustrated for exemplary purposes only. POI analysis component 662 also includes integration component 678.

Parsing component 670 receives the streaming information at its input. In the embodiment illustrated, the streaming information may include a plurality of streams (although only a single stream may be processed as well), such as a written textual stream (e.g., closed caption information), a video stream and an audio stream. Parsing component 670 parses the incoming streaming information into its respective stream components and provides those components to appropriate analysis blocks 672, 674 and 676.

Analysis components 672, 674 and 676 analyze the incoming streams, identify potential points of interest and generate information indicative of the location of the those points of interest. The streaming information, as well as the sync point information, is then provided from each analysis component 672–676, to integration component 678. In the embodiment illustrated, integration component 678 re-integrates the streams into the original streaming information, and also embeds the sync point information at appropriate locations within the streaming information. Thus, the in-band sync point information is provided in the data stream at the output of integration component 678.

It should be noted that the analysis components 672–676 can look for substantially any desired points of interest. For example, written language component 672 can be configured to look for sentence boundaries or word boundaries. In looking for sentence boundaries, the analysis component can simply be configured to look for periods in the incoming stream. To look for word boundaries, component 672 can be configured to simply look for spaces in the incoming stream.

It should also be noted that language analysis component 672 can be a more sophisticated analysis component, such as a natural language processing or natural language analysis component, in which case component 672 can be configured to identify certain types of clauses, surnames, parts of speech, etc. In any case, information indicative of the written language points of interest to be identified by component 672 is provided to component 672 such that the desired points of interest can be identified in the incoming stream.

Similarly, video analysis component 674 can be used to identify any number of different points of interest. For example, component 674 can be configured to identify commercial breaks, as well as to identify the I, B and P frames mentioned above. In identifying commercial breaks in the incoming video stream, video analysis component 674 can simply be configured to look for a black screen which exists for a certain predetermined amount of time. Similarly, in the MPEG2 video format, the I, B and P frames include markers identifying them as such, or are preceded by a header identifying the frames. Therefore, video analysis component 674 can be configured to look for the identifying information in the stream.

Audio analysis component 676 can also be configured to look for a wide range of points of interest. By way of example, if the incoming stream is from a horror genre film, a war genre film, or an action genre film or television program, audio analysis component can be configured to look for loud noises, such as screams, gun shots, or car chase noises. In that instance, component 676 can simply be configured to look for amplitude information which exceeds a predetermined threshold. Similarly, component 676 can be a more advanced component, such as a speech recognition or voice recognition component. In the instance in which component 676 includes a speech recognition component, it can be configured to look for sentence or word boundaries, or it can be used to look for particular words or phrases. For example, component 676 can be used to identify words of profanity which can be marked for later deletion. Similarly, where component 676 includes a voice recognition component, it can be configured to identify the voice of certain actors or actresses, or any other entity which can be so identified.

It should again be mentioned that the point of interest analysis component 662 can be configured to identify the location of substantially any point of interest which can be identified. Component 662 simply needs to be provided with the information indicative of points of interest to be analyzed, as well as information indicative of the type of information and format of information which will be received in the streams provided thereto. The specific embodiments mentioned above are simply provided as examples, and are not to be viewed as limiting the application of this feature of the present invention.

Figure 22:
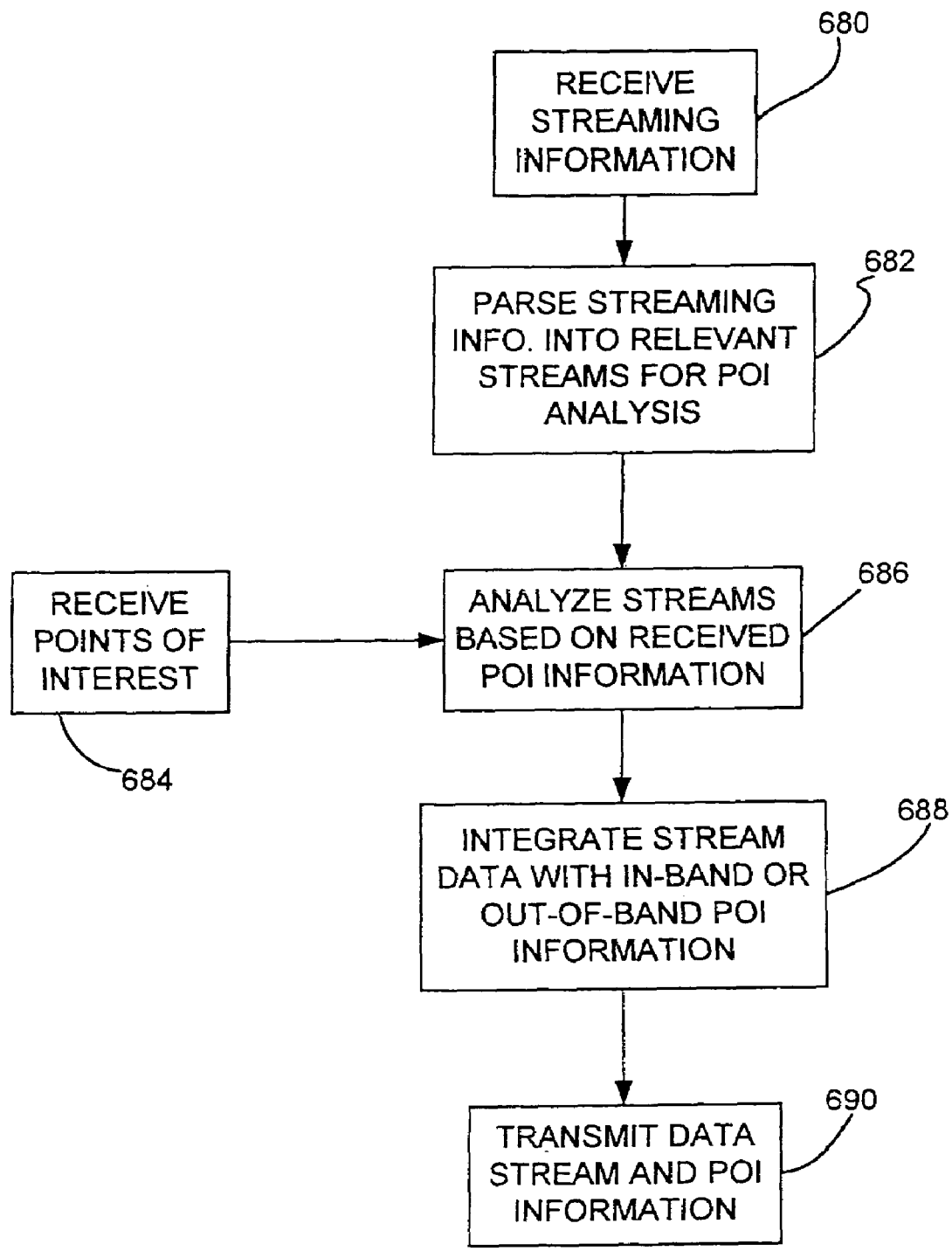

FIG. 22 is a flow diagram which illustrates the operation of POI analysis component 662 in more detail. First, POI analysis component 662 receives the streaming information. This is indicated by block 680. Parsing component 670 then parses the streaming information into its respective streams for a point of interest analysis. This is indicated at block 682. At some point, prior to point of interest analysis, point of interest analysis information indicative of the points of interest to be identified must be provided to the various analysis components in POI analysis component 662. This is indicated by block 684. The streams are then analyzed based upon the received point of interest information as indicated by block 686.

Once the point of interest information is derived from the streams, the streams are then reintegrated and the point of interest information is provided either in-band or out-out-band, along with the integrated streams. This is indicated by block 688. The data stream and the point of interest information is then transmitted to a downstream component (such as delay filter 112) for further processing. Again, it should be noted that the point of interest information can either be provided in-band or out-out-band. This is indicated by block 690 in FIG. 22.

Figure 23:
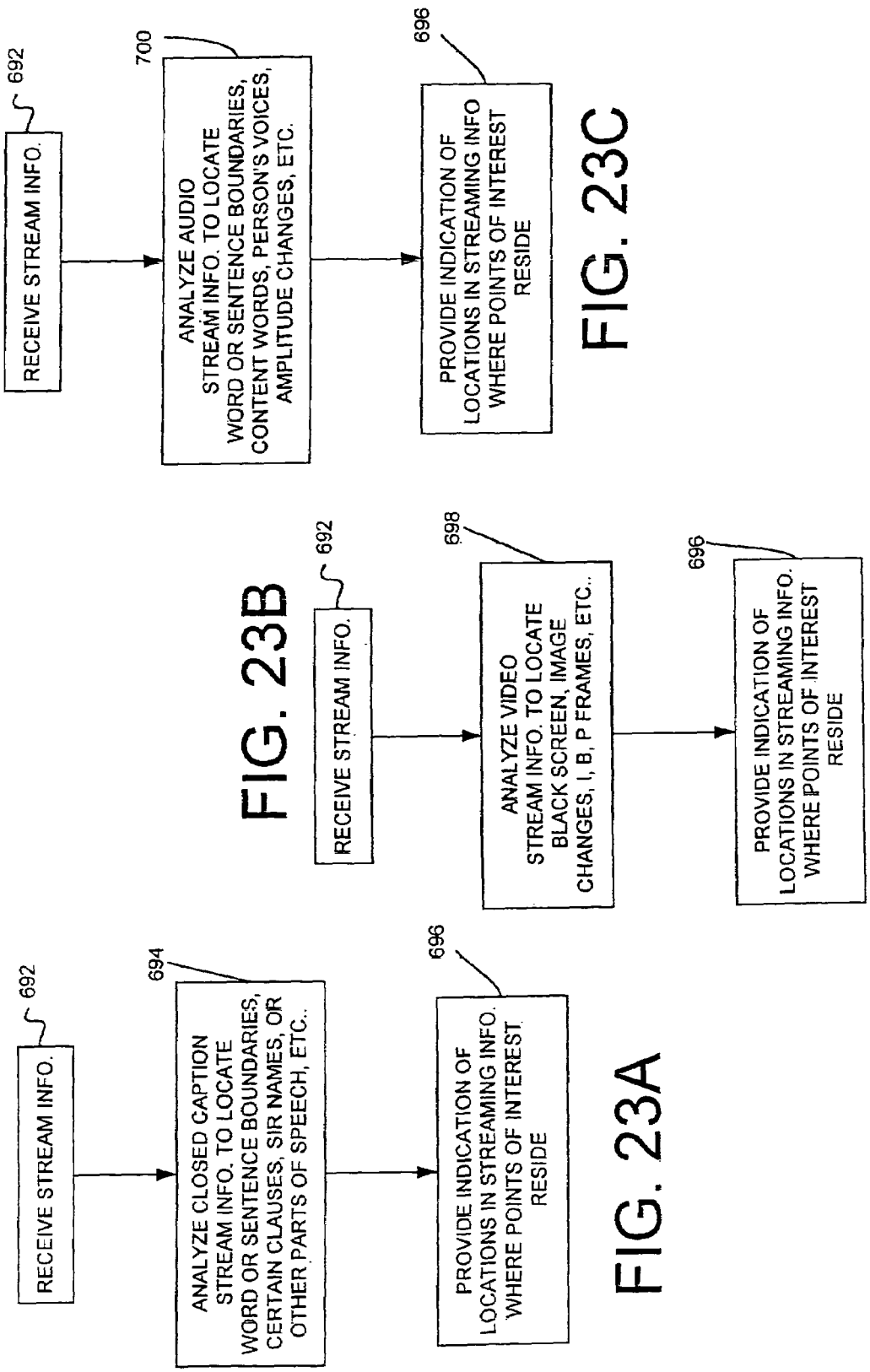

FIGS. 23A, 23B and 23C are more detailed flow diagrams illustrating the operation of written language analysis component 672, video analysis component 674 and audio analysis component 676. FIG. 23A illustrates that written language analysis component 672 first receives the written language stream information (such as closed caption information). This is indicated by block 692. Component 672 then analyzes the stream information to locate word or sentence boundaries, certain clauses, surnames or other parts of speech, etc. Again, the point of interest identified can be substantially any points of interest for which component 672 is properly configured. This is indicated by block 694. Component 672 then provides an indication of the locations in the streaming information where the points of interest reside. This is indicated by block 696.

FIG. 23B is similar to FIG. 23A, and similar items are correspondingly numbered. However, rather than locating textual points of interest, video analysis component 674 analyzes the video stream information for a black screen, image changes (which may correspond to desired scene changes), I, B and P frame markers, etc. This is indicated by block 698.

FIG. 23C is similar to FIGS. 23A and 23B, and similar items are similarly numbered. However, rather than analyzing written language or video information, component 676 analyzes audio stream information. In the embodiment illustrated in FIG. 23C, component 676 analyzes the audio stream information for amplitude changes, sentence or word boundaries, certain content words (e.g., profanity), a certain persons voice, etc. This is indicated by block 700.

Index Generation

As described above, reader modules 614–620 in system 610 are configured such that they can seek to any indexed point, in buffer 124. For information streams which do not have sync points, it is reasonable for the reader module to seek to substantially any sample within buffer 124. Therefore, in such information streams, any sample can be indexed. In such an embodiment, indexer 132 generates index entries which simply correspond to the desired granularity of the indexer. For instance, it may be desirable in certain streams to index points which are temporally spaced by approximately 0.25 seconds. With other information, it may be desirable to index points which are spaced by two seconds or more. In information streams which have no sync points, indexer 132 simply generates index entries identifying locations in buffer 124 which are separated by the desired granularity of the indexer.

However, as discussed in the previous section, many data streams will be provided with sync points. In those cases, it may be desirable for indexer 132 to generate index entries which correspond only to sync points. It will, of course, be noted that if sync points occur more frequently than the desired granularity of the index generator, every single sync point may not be indexed. However, if sync points do not occur more frequently than the desired granularity of the index generator, substantially every sync point may be indexed.

Figure 24:
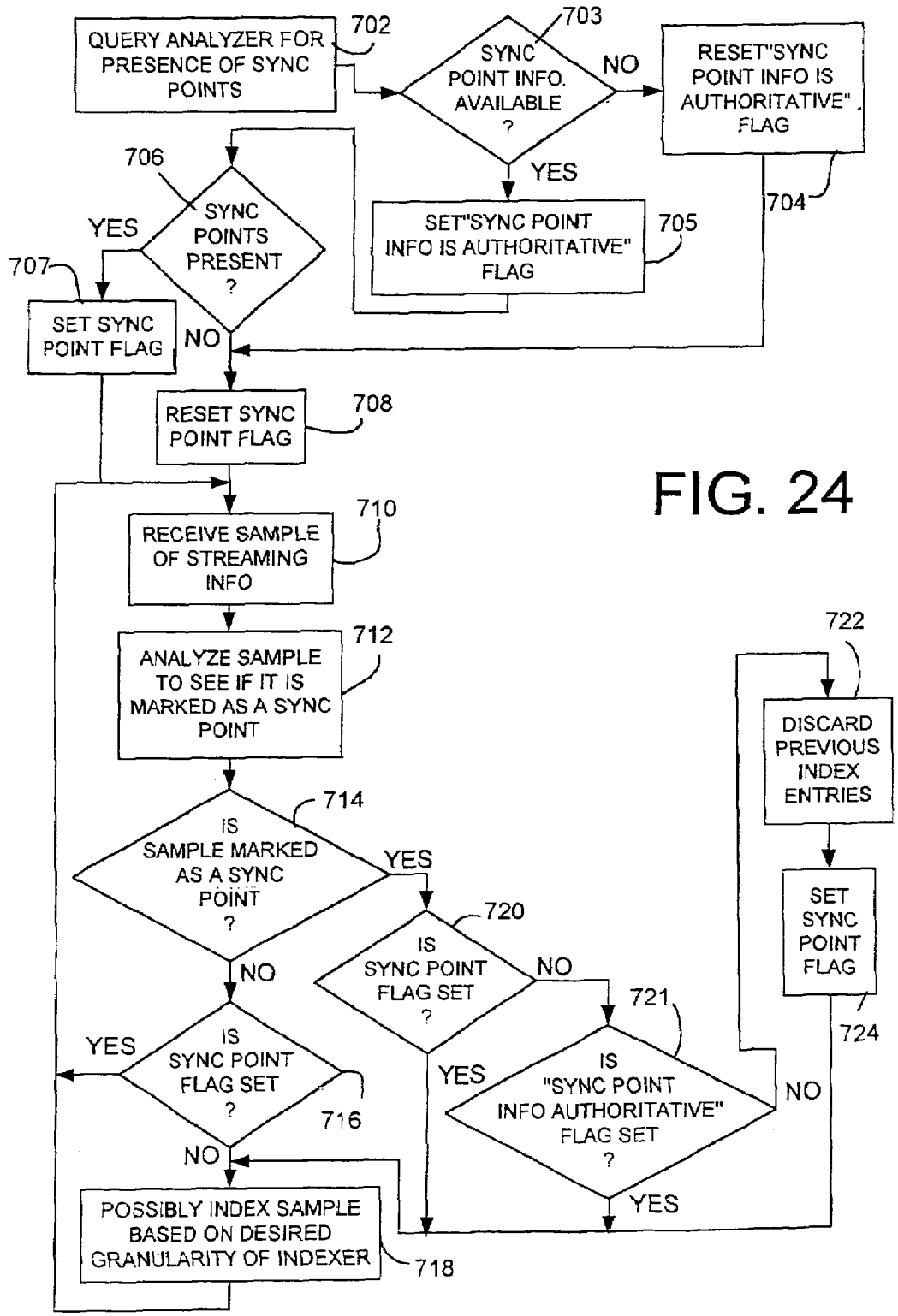
FIG. 24 is a flow diagram illustrating indexing.

Under such an arrangement, a problem can arise. For example, in a given streaming architecture, stream analyzer 654 described above may not exist, or it may not yet know whether the streaming information it is receiving contains any sync points. That being the case, indexer 132 may not know, at the time it begins receiving streaming information, whether it must simply begin indexing samples according to its granularity, or whether it is to wait to index only sync points. FIG. 24 is a flow diagram illustrating the operation of indexer 132 in addressing this problem.

First, indexer 132 simply executes a query against stream analyzer 654 to determine whether stream analyzer 654 can provide information as to whether the incoming streaming information contains sync points. This is indicated by block 702. Stream analyzer 654 may not even provide a response, or it may provide a response indicating that it does not yet know whether the streaming information contains sync points. If analyzer 654 provides a response indicating that information indicative of whether sync points exist is available, a flag is set. The flag is referred to in FIG. 24 as the "Sync Point Info Is Authoritative" flag. This is indicated by blocks 703 and 704. If there is no information available that is indicative of whether sync points exist, this flag is reset, as indicated by blocks 703 and 705.

Next, if information as to the presence or absence of sync points is available, it is determined whether any sync points are present. This is indicated by block 706. If stream analyzer 654 has already identified sync points in the incoming streaming information, it provides indexer 132 with a response indicating that sync points do exist. In that case, indexer 132 sets a sync point flag to a value which indicates that the incoming streaming data does, in fact, contain sync points. This is indicated by block 707. However, if stream analyzer 654 does not respond, or it has not yet located sync points in the incoming streaming information, and provides an output indicative of that to indexer 132, indexer 132 assumes, for the moment, that there are no sync points in the incoming streaming information, and resets the sync point flag. This is indicated by block 708. Indexer 132 then receives a sample of the streaming information as indicated by block 710.

Upon receipt of the sample, indexer 132 analyzes the sample to see if the sample has been marked as a sync point. This is indicated by blocks 712 and 714. If the sample has not been marked as a sync point, indexer 132 examines the sync point flag to see whether the sync point flag is set. This is indicated by block 716. If, at block 716, it is determined that the sync point flag is indeed set, that indicates that the streaming information being processed does contain sync points, and the present sample is not marked as a sync point. Therefore, indexer 132 does not index the sample under analysis but simply returns to processing at block 710.

If, however, at block 716, it is determined that the sync point flag is not set, indexer 132 is still assuming that no sync points exist in the incoming streaming information. Therefore, the indexer simply determines whether it should index the present sample under analysis, based on the desired granularity of indexer 132. In other words, if indexer 132 is to index points no more often than every one half second (for example), indexer 132 determines whether the present sample is temporally removed from the previously indexed sample by at least one half second. If so, the present sample is indexed. If not, processing simply returns to block 710. This is indicated by block 718.

If, at block 714, indexer 132 determines that the present sample is marked as a sync point, indexer 132 then determines whether the sync point flag is currently set. This is indicated at block 720. If the sync point flag is currently set, indexer 132 simply continues processing at block 718 and determines whether it has reached sufficient temporal displacement from the previous index entry to index the present sync point.

However, if, at block 720 it is determined that, even though the present sample is marked as a sync point, the sync point flag is not set, then indexer 132 determines whether the "Sync Point Info Is Authoritative" flag is set, at block 721. If not, then indexer 132 realizes that it has been assuming that no points exist in the streaming information under analysis, but it also realizes that sync points do actually exist. Therefore, indexer 132 discards all the previous index entries (since they corresponded to non-sync point samples) as indicated at block 722 and sets the sync point flag as indicated by block 724. Processing then again continues with respect to block 718. Similarly, if at block 721 it is determined that the "Sync Point Info Is Authoritative" flag is set, processing continues at block 718.

Therefore, it can be seen that by using the algorithm illustrated in FIG. 24, this feature of the present invention can be used to accurately index points in the streaming information, regardless of whether the indexer currently knows whether the sync points are present in the streaming information. Where sync points are not present, samples will be indexed according to the desired granularity of the indexer. When sync points are present, only sync points will be indexed.

Time Shift Seeking with Multiple Streams

As described above, the streaming information stored in buffer 124 can include multiple streams. As is also describe above, it may be desirable to allow reader modules 614–620 (illustrated in FIG. 20) to seek to various points in the streaming information indexed by indexer 132. This presents some difficulty. It is difficult to decide at which particular file offset within buffer 124 the particular reader module should begin reading, after a seek is requested. This decision is made difficult by a number of factors.

For example, the streams can be out of sync within the file located in buffer 124. In other words, audio information can be stored before or after video information, and in different size storage blocks, such that the two do not directly coincide. Also, the reader module may request to seek to a position in buffer 12 (to a sample with a particular time stamp) for which no sync point has been indexed. In other words, as set out above, indexer 132 does not index every single sample. Instead, it only indexes based on its own granularity, or based on sync points. Therefore, a reader module may request to seek to a time stamp for which no index entry is available. Further, some streams may contain sync points while others may not. In addition, not all sync points may be indexed, since they may occur more frequently than the desired granularity of the index. One illustrative feature of the present invention is directed to addressing these obstacles in seeking through a channel having multiple streams.

Figure 25:
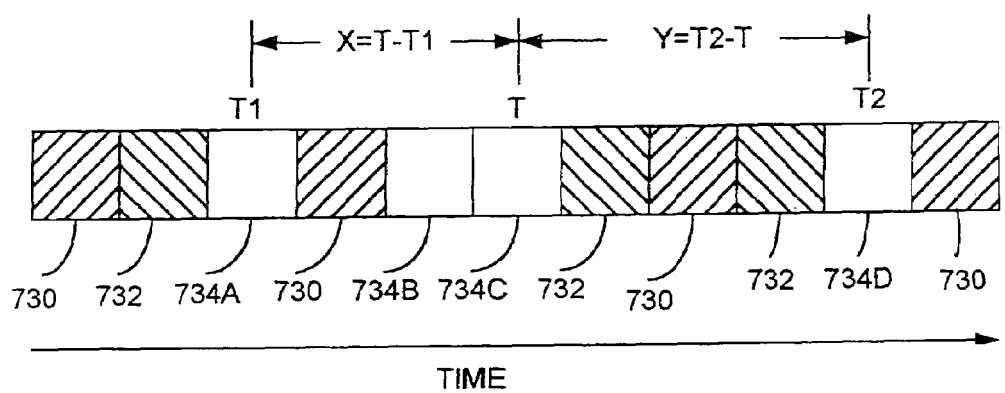
FIG. 25 is an illustration of a portion of a data buffer.

FIG. 25 is one exemplary illustration of a portion of buffer 124 which is divided into a plurality of buffered samples. Samples 730, having cross-hatching in a first direction, represent samples of a first stream. Samples 732, with cross-hatching in the opposite direction, correspond to samples of a second stream. Samples 734A, 734B, 734C and 734D, with no cross-hatching, correspond to samples of a third stream.

Figure 26:
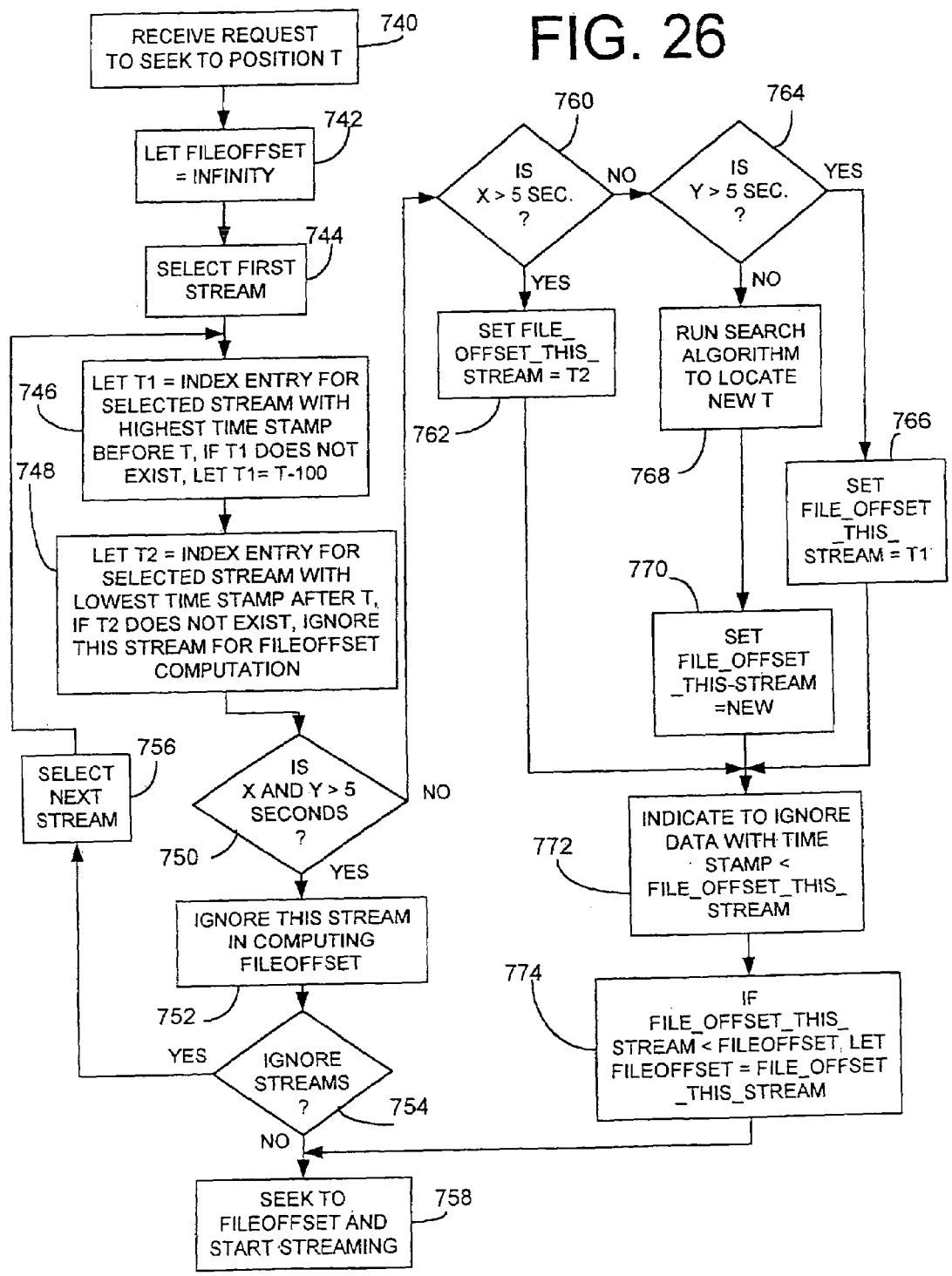
FIG. 26 is a flow diagram illustrating a seeking operation.

In order to address the obstacles identified above, one illustrative embodiment of the present invention is a seek algorithm which is described with respect to FIGS. 25 and 26. In the algorithm, the particular reader module conducting a seek seeks to a highest file offset within buffer 124 which is suitable to satisfy each of the stream's individual seeking requirements. The reader module then begins streaming information, but drops information for each of the streams being read which is read before the first sample that should actually be played for that stream. In addition, where no sync points with the exact time stamp have been indexed, the nearest sync point before the desired seek position is provided as a potential starting point, unless the nearest sync point before the desired seeking position is too far into the past. Since some streams contain no sync points, the present invention assumes that, in a stream with no sync points, every sample is a sync point. Finally, since not all sync points may be indexed, the seeking algorithm first finds a nearest indexed sync point before and after the desired seek position, and then determines the difference between the two indexed seek points to see whether there may be more sync points, which are not indexed, between the two. If so, the data between the two indexed sync points is read to determine whether additional sync points (and ones closer to the desired seek point) exist.

More specifically, FIG. 26 is a flow diagram illustrating a seeking operation in accordance with one illustrative feature of the present invention. In order to seek to a position within buffer 124 (illustrated in FIG. 25) the designated reader module first receives a seek request to seek to a position in buffer 124 having a time stamp indicating time T. This is indicated by block 740. In FIG. 25, the time stamp T corresponds to sample 734C. In the illustrative embodiment, sample 734C is not indexed.

Next, a variable FILEOFFSET is set to infinity (or a very large number). This is indicated by block 742.

The first of the plurality of streams is then chosen for analysis. This is indicated by block 744.

For the first stream, a time variable T1 is set to the index entry with the highest time stamp before the desired seek time T. In FIG. 25, it can be seen that sample 734A for the designated stream corresponds to the index entry T1 which has the highest time stamp before the desired seek time T. If no such index entry exists, then T1 is set to T−Z. In one illustrative embodiment, Z=100. This basically causes T1 to be discarded as will be illustrated in later processing. This is indicated by block 746.

Next, a time period T2 is set to an index entry for the selected stream with the lowest time stamp after the desired seek time T. It can be seen that sample 734D corresponds to a sample in the selected stream which is indexed, and which has the lowest time stamp to the right of time T (e.g., after time T). If no such index entry exists, the presently selected stream is ignored for purposes of computing the file offset, and a new stream is selected. This is indicated by block 748.

Thus, after processing at block 748, it can be seen that the two index entries which lie on either side of time T, and which are closest to time T, have been identified. Those index entries correspond to times T1 and T2. The temporal displacement between the desired time T and the previously indexed time T1 is represented by X=T−T1. The temporal displacement between the desired seek time T and the subsequent index entry T2 is represented by Y=T2−T.

If both X and Y are greater than a predetermined time interval (e.g., five seconds) that indicates that both of the indexed samples T1 and T2 are too far from the desired seek position T to be helpful. This determination is indicated by block 750. If it is the case that X and Y are greater than the predetermined time interval, then the present stream is simply ignored in computing FILEOFFSET. This is indicated by block 752. Processing then continues at block 754 where it is determined whether additional streams exist. If so, a next stream is selected at block 756 and processing continues with respect to block 746. If no additional streams exist, a seek is performed at block 758, which is described in greater detail below.

If, at block 750, it is determined that both values X and Y are not greater than the predetermined time interval, then it is determined whether either X or Y are greater than the predetermined time interval. For example, at block 760, it is determined whether value X (which corresponds to T−T1) is greater than five seconds. If so, then the value Y must not be greater than five seconds, and a variable FILE_OFFSET_THIS_STREAM is set to index value T2. This is indicated by block 762.

If, at block 760, it is determined that the value of X is not greater than five seconds, then it is determined whether the value Y is greater than five seconds. If so, then the value T2 can be ignored and the variable FILE_OFFSET_THIS_STREAM is set to value T1. This is indicated by blocks 764 and 766.

Basically, blocks 760–766 determine whether either index values T1 or T2 are too far separated from the desired seek time T to be of help. If they are, they are eliminated from further computing.

If, however, at block 764, it is determined that the value Y is not greater than five seconds, that means that both samples corresponding to values T1 and T2 are close enough to desired seek time T to be of interest. That being the case, it is determined whether other sync points between T1 and T2 may exist. In other words, if a distance between T1 and T2 is so small that no other sync points could have been indexed between them (based on the desired granularity of the indexer) then additional sync points may exist between samples T1 and T2 which are closer to the desired seek position T, but which have simply been omitted from the index because the granularity of the indexer was not sufficient to accommodate an additional index entry.

Therefore, a search algorithm is conducted in which the samples of the selected stream which reside between samples T and T1 are searched to determine whether they are in fact sync points. If so, that would mean that those sync points are closer in time to the desired seek position T, and are prior in time to that seek position. If that is true, then the variable FILE_OFFSET_THIS_STREAM is set to the value corresponding to that identified sync point. This is indicated by blocks 768 and 770.

Therefore, at this point in the processing, the desired file offset for the stream under analysis has either been chosen to be T1, T2, or a value between T1 and T. Then, for the stream under analysis, the seek algorithm requests subsequent filters in the streaming process to ignore any data samples which are read out of buffer 12 and have time stamps prior to that identified by the variable FILE_OFFSET_THIS_STREAM. This is indicated by block 772.

Once the variable FILE_OFFSET_THIS_STREAM has been derived, it is determined whether that value is less than the current value of the variable FILEOFFSET. If this is the first selected stream, the value will be less than the current value of FILEOFFSET, which has been set to infinity.

However, if this was a second, third, or later selected stream, then the file offset for the present stream under analysis will be used as the value for the variable FILEOFFSET only if it is further to the left (or earlier in time) than the current value for the variable FILEOFFSET. This has the effect of moving the seek point which will actually be used in seeking in buffer 124 to a point far enough left in the buffer to satisfy every stream's individual seeking requirements. This is indicated by block 774.

Next, processing continues at block 754 where it is determined whether additional streams need to be analyzed. If so, processing continues at block 756. If not, processing continues at block 758. In block 758, the selected reader module is commanded to seek to the sample identified by the variable FILEOFFSET and start streaming data from buffer 124 at that point. Since in block 772, a value has been set for each stream indicating that streamed data prior to the desired sync point for that stream is to be ignored, the data streamed out of buffer 124 will not be rendered for a given stream unless that data is coincident with, or after, the earliest sync point identified for that given stream (and identified by the variable FILE_OFFSET_THIS_STREAM).

One embodiment of pseudocode corresponding to the flow diagram of FIG. 26 is set out below:

```
FileOffset=INFINITY
for (every connected stream){
  T1=Find the index entry with the highest timestamp
    before T;
  if (T1 does not exist)
    T1=T−100;//so that we ignore T1
  T2=Find the index entry with the lowest timestamp after
    T;
  If (T2 does not exist)
    Continue;//no index—ignore this stream in computing
      file offset
  If ((T−T1>5 sec) AND (T2−T>5 sec))
    Break;
  else if (T−T1>5 sec)//"too far"
    FileOffsetForThisStream=FileOffset(T2);
  Else if (T2−T>5 sec)//"too far"
    FileOffsetForThisStream=FileOffset(T1);
  Else{//neither one is "too far"
    Search through the portion of the file between FileOff-
      set(T1) and FileOffset(T2)
    To find the sync point with the highest time stamp that
      is still below T.
    The position of that sync point becomes FileOffsetFor-
      ThisStream.
    Then tell the splitter to discard any samples for this
      stream whose timestamps
    are smaller than the one we just found.
  }
  If (FileOffsetForThisStream<FileOffset)\
    FileOffset=FileOffsetForThisStream;
}
Seek to FileOffset and start streaming.
```

Thus, it can be seen that the algorithm illustrated in FIG. 26 solves a number of problems. With respect to streams that can be out of sync in a file, the algorithm seeks to the highest file offset suitable to satisfy every stream's individual seeking requirements. The reader module then begins streaming at that point, but drops everything prior to the first sample that should actually be played for each given stream. Similarly, where no sync point exists with the exact desired time stamp (the desired seek position), the seek position is set to the nearest sync point before the desired seek position, unless the nearest sync point is too far to the left (into the past). Also, since some streams may contain seek points while others may not, every sample in a stream without seek points is deemed to be a suitable seek point. Finally, since not all seek points may be indexed, the seeking algorithm first finds the nearest indexed seek points before and after the desired seek position and then looks at the difference between those indexed points to determine whether any sync points may reside between them. If so, the samples to the left of the desired seek position are read to look for additional sync points.

Although the present invention has been described with reference to preferred embodiments, workers skilled in the art will recognize that changes may be made in form and detail without departing from the spirit and scope of the invention.

What is claimed is:

1. An information appliance for handling streaming information for storage in a circular buffer comprising a plurality of partitions defined by boundaries, the information appliance adapted to perform steps, comprising:
    receiving streaming information from a source of streaming information;
    forming data blocks wherein each data block includes a payload field capable of holding a portion of the streaming information and an identification field indicative of the source of the streaming information;
    writing at least one data block to the circular buffer to partially fill a partition;
    generating at least one padding block having a field indicative of non-streaming information and having a size being a function of remaining space in the partition; and
    writing the padding block to the circular buffer adjacent a boundary of the partition.

2. The information appliance of claim 1 wherein the step of writing the at least one data block comprises writing the at least one data block adjacent one of the boundaries.

3. The information appliance of claim 1 wherein the data blocks are of variable size.

4. The information appliance of claim 1 wherein each of the data blocks includes a first pointer field indicating a location of a succeeding data block and a second pointer field indicating a location of a preceding data block, and wherein the step of forming includes ascertaining pointer data for each of the pointer fields.

5. An information appliance for handling streaming information for storage in a circular buffer comprising a plurality of partitions defined by boundaries, the information appliance adapted to perform steps, comprising:
    receiving streaming information from a source of streaming information;
    forming similarly structured data blocks wherein each data block includes a payload field capable of holding a portion of the streaming information and an identification field indicative of the source of the streaming information;
    writing at least two data blocks to the circular buffer to partially fill a partition;
    generating at least one padding block having a field indicative of non-streaming information and having a size being a function of remaining space in the partition; and
    writing said at least one padding block to the circular buffer to fill the remaining space in the partition.

6. The information appliance of claim 5 wherein the step of writing the padding block comprises writing the padding block in the circular buffer adjacent a boundary.

7. The information appliance of claim 5 wherein the data blocks are of variable size.

8. The information appliance of claim 5 wherein each of the data blocks includes a first pointer field indicating a location of a succeeding data block and a second pointer field indicating a location of a preceding data block, and wherein the step of forming includes ascertaining pointer data for each of the pointer fields.

* * * * *